United States Patent
Amento et al.

(10) Patent No.: US 10,462,212 B2
(45) Date of Patent: Oct. 29, 2019

(54) HYBRID CLOUDS

(71) Applicant: AT&T Intellectual Property I, L.P., Atlanta, GA (US)

(72) Inventors: Brian Amento, Morris Plains, NJ (US); Robert J. Hall, Berkeley Heights, NJ (US); Kaustubh Joshi, Scotch Plains, NJ (US); Kermit Hal Purdy, Bernardsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 195 days.

(21) Appl. No.: 15/337,483

(22) Filed: Oct. 28, 2016

(65) Prior Publication Data

US 2018/0124158 A1 May 3, 2018

(51) Int. Cl.

| H04L 29/08 | (2006.01) |
| H04L 29/06 | (2006.01) |
| H04L 12/24 | (2006.01) |
| H04W 24/02 | (2009.01) |
| H04W 84/18 | (2009.01) |
| G06F 16/2455 | (2019.01) |
| G06F 9/54 | (2006.01) |

(52) U.S. Cl.
CPC .......... H04L 67/10 (2013.01); H04L 41/0806 (2013.01); H04L 41/5041 (2013.01); H04L 63/1441 (2013.01); H04L 67/1097 (2013.01); H04W 24/02 (2013.01); G06F 9/541 (2013.01); G06F 16/24568 (2019.01); H04W 84/18 (2013.01)

(58) Field of Classification Search
CPC ....... G06F 11/3672; G06F 2009/45583; H04L 63/20
See application file for complete search history.

(56) References Cited

U.S. PATENT DOCUMENTS

| 8,583,769 | B1 * | 11/2013 | Peters | .................... G06F 9/541 709/221 |
| 8,589,441 | B1 * | 11/2013 | Sunada | ............... H04L 67/1097 707/703 |
| 9,009,697 | B2 | 4/2015 | Breiter et al. | |
| 9,122,552 | B2 | 9/2015 | Whitney et al. | |
| 9,262,144 | B1 | 2/2016 | Apte et al. | |
| 9,313,048 | B2 | 4/2016 | Chang et al. | |
| 9,432,794 | B2 | 8/2016 | Agrawal et al. | |
| 9,462,040 | B2 | 10/2016 | Addepalli et al. | |
| 2015/0180949 | A1 | 6/2015 | Maes et al. | |
| 2015/0319160 | A1 * | 11/2015 | Ferguson | ............. H04L 9/0894 726/10 |
| 2015/0381712 | A1 * | 12/2015 | de Castro Alves | ........................ G06F 16/24568 709/201 |
| 2016/0080501 | A1 | 3/2016 | Freimuth et al. | |

(Continued)

OTHER PUBLICATIONS

Lopez, Garcia Pedro, et al., "Edge-Centric Computing: Vision and Challenges," ACM SIGCOMM Computer Communication Review 45.5 (2015): 37-42.

*Primary Examiner* — Barbara B Anyan
(74) *Attorney, Agent, or Firm* — BakerHostetler

(57) ABSTRACT

Systems and methods are disclosed for creating and managing hybrid clouds including both standard compute nodes and edge devices. Edge devices can be enrolled in a hybrid cloud by deploying a lightweight container to the edge device.

19 Claims, 12 Drawing Sheets

(56) References Cited

U.S. PATENT DOCUMENTS

| | | | |
|---|---|---|---|
| 2016/0087956 A1* | 3/2016 | Maheshwari | G06F 8/60 |
| | | | 726/6 |
| 2016/0103699 A1 | 4/2016 | Thakkar et al. | |
| 2016/0308958 A1* | 10/2016 | Navali | H04N 21/2662 |
| 2017/0048079 A1* | 2/2017 | Nethi | H04L 12/2836 |
| 2017/0344462 A1* | 11/2017 | Vecera | G06F 11/3668 |
| 2017/0366605 A1* | 12/2017 | Chang | H04L 47/70 |
| 2018/0004953 A1* | 1/2018 | Smith, II | H04L 63/1441 |

\* cited by examiner

HYBRID CLOUDS

TECHNICAL FIELD

The disclosure herein generally relates to computer networks, and more particularly to hybrid clouds utilizing traditional compute nodes and edge devices for cloud tasks.

BACKGROUND

"The cloud" is a powerful concept and buzzword in modern computing. It promises scalable and elastic capability to allow access and computing power anywhere, any time, so long as a network connection to cloud resources is available. With regard to scalability and elasticity, clouds depend on nodes to provide communication, processing, and storage. These nodes are typically servers and groups of servers which run software to allow the devices to perform or share tasks and data within the cloud on behalf of the cloud or its clients.

This software is typically configured for use on servers or groups of servers and can be resource intensive. It can involve a high level of virtualization and include a wide variety of services utilizing local node resources to expedite processing of cloud activity.

SUMMARY

In an embodiment, a method includes identifying an edge device in network communication with a cloud extension component of a managed cloud and deploying a lightweight management container to the edge device. The lightweight management container shares a common control plane with a standard management container used on a traditional compute node in the cloud. The method further includes enrolling the edge device in the cloud using the lightweight management container.

In an embodiment, a system includes a cloud extension component of a managed cloud. The cloud extension component os configured to communicate with edge devices and traditional compute nodes. The cloud extension component deploys a standard management container to traditional compute nodes, and the cloud extension component deploys a lightweight management container to the edge devices. The lightweight management container shares a common control plane with the standard management container used on a traditional compute node in the cloud, and the lightweight management container enrolls the edge device in the cloud.

In an embodiment, a system comprises a processor and computer readable media storing instructions. The instructions are configured to identify an edge device in network communication with a cloud extension component of a managed cloud and deploy a lightweight management container to the edge device. The lightweight management container shares a common control plane with a standard management container used on a traditional compute node in the cloud. The instructions are also configured to enroll the edge device in the cloud using the lightweight management container.

In embodiments, non-transitory computer readable media can store instructions for performing or causing aspects disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the herein described telecommunications network and systems and methods for hybrid clouds are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
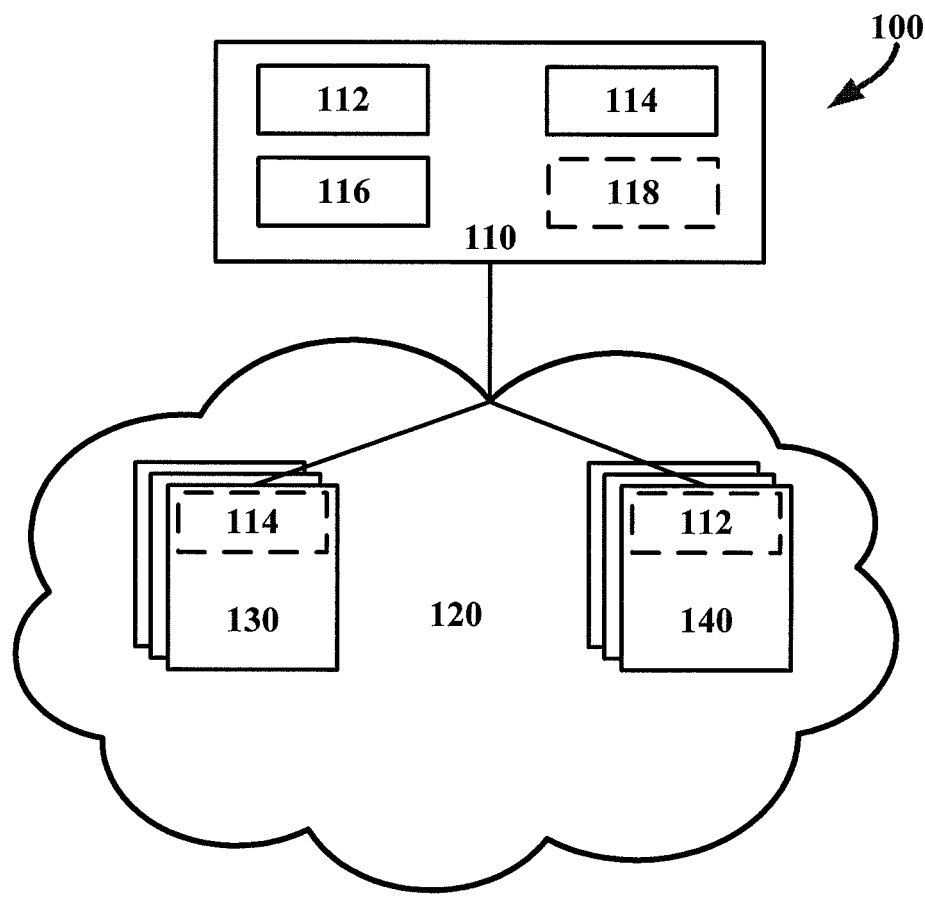
FIG. 1 illustrates an example system in accordance with the disclosure.

Aspects disclosed herein generally relate to hybrid clouds which seamlessly integrate edge devices into a cloud containing traditional compute nodes and cloud infrastructure. In this fashion non-traditional edge devices can serve as nodes within a cloud and be leveraged for their available resources without becoming dedicated cloud nodes.

Traditional clouds supported by traditional compute nodes use collections of servers to store, process, and communicate data through a cloud network. These traditional compute nodes typically include dedicated servers designed for network use, as well as desktop computing resources having a footprint rendering them less portable than edge devices. The size and arrangement of traditional compute nodes allows them to be physically larger, including more processors, storage, et cetera, as well as consistently utilizing more shared or network resources in terms of bandwidth, electrical power, et cetera.

Clouds can be managed to perform functionality associated with the cloud. The functionality can be specifically tailored (e.g., a file server arrangement to allow remote data access) or general in nature (e.g., provide file access while supporting virtual machines running a variety of operating systems to create instances of applications run remotely). For the functionality to be provided, though, systems must be enrolled in the cloud to allow their use by clients with access to the cloud. This requires deployment of enablers such as software (and, in some embodiments, hardware) enabling remote communication and control, as well as enabling the node to provide functionality expected of the cloud. These enablers can be resource intensive, making them inappropriate for devices with limiting processing power, memory, or bandwidth, or devices which are battery operated where lengthy periods of intensive resource use may result in rapidly exhausting energy available.

Nonetheless, as edge devices evolve and become more numerous, possible cloud resources go unutilized due to the inability to integrate edge devices into traditional clouds. Edge devices not only possess processing power, memory, and the ability to retransmit information beyond the reach of dedicated resources, but also frequently include a variety of sensors which can provide accurate, realtime information in relation to their location.

To utilize these resources without excessively burdening edge devices, edge devices can be enrolled in a hybrid cloud using a lightweight management container, as opposed to a standard management container which enables traditional compute nodes to participate in the cloud. The lightweight management container is less resource intensive and can leverage functionality provided by traditional compute nodes as opposed to performing all available cloud functionality locally. The lightweight management container operates on the same control plane as the standard management container, thereby providing common protocols and compatible procedures. In this fashion, a unified cloud including both edge devices and traditional compute nodes is created, in comparison with edge devices merely acting as clients of a traditional cloud or existing in a separate cloud due to control and communication differences. Control of compute nodes or edge devices can provide for mixed initiative management, permitting multiple owners or managers (e.g., service provider connecting or leasing device, end user utilizing device) to continue local use of a device enrolled in a hybrid cloud. The hybrid cloud or aspects thereof can be dynamically scoped to assist with management of the changing set of edge devices. Further, security can be provided to ensure edge devices and lightweight management containers deployed to edge devices maintain integrity and present no threat to the hybrid cloud or other elements interacting therewith.

As used herein, an edge device is an electronic device capable of interacting or communicating with other electronic or logical elements over a network. Examples of an edge device can include a cellular phone, mobile device, portable media player, storage device, camera, router, modem, network gateways, consumer media server, set top box, media recorder, firewall, smart TV, tablet, remote, wearable (e.g., watch, fitness tracker, health monitor, pet collar), microphone, alarm system, safety system, gaming system, monitoring device, internet of things (IoT) device or component such as smart vehicle, smart appliance, remote-controlled vehicle (e.g., ground drone, aerial drone, waterborne drone), voice-activated electronic assistant, smart lock or opener, climate control system, smart meter, et cetera. These examples are intended to be descriptive, but not exhaustive, and those of skill in the art will appreciate a vast number of other devices or components which can be utilized as edge devices in hybrid clouds in view of the disclosure herein.

FIG. 1 illustrates an example system 100 for creating or managing a managed, hybrid cloud including traditional compute nodes and edge devices. System 100 includes extension component 110 which provides resources for creating or managing a hybrid cloud such as hybrid cloud network 120. Extension component 110 includes lightweight management container 112, standard management container 114, conductor component 116, and, in embodiments, monitor component 118.

Extension component 110 is used to create or manage a hybrid cloud, such as hybrid cloud network 120, by enrolling both traditional compute nodes (such as standard compute nodes 130) and edge devices 140 into a hybrid cloud. In this regard, extension component 110 extends a traditional cloud to utilize edge devices. Extension component 110 also defines the framework common to both standard compute nodes 130, edge devices 140, and discrete or distributed cloud management elements. To ensure compatibility with standard compute nodes 130 and edge devices 140, management containers can be deployed to allow standard compute nodes 130 and edge devices 140 to operate according to the framework and interact with cloud resources or clients.

Lightweight management container 112 can be deployed, using extension component 110 or other cloud elements, to edge devices 140. Extension component 110 can store lightweight management container 112 or access lightweight management container 112 remotely to cause its deployment. Lightweight management container 112 can include software elements which can be downloaded to and installed or run on edge devices 140 to allow cloud interaction. Lightweight management container can include, or provide remote access to, services, applications, or resources from the cloud, or provided to the cloud by edge devices 140. In contrast with standard management container 114, lightweight management container 112 excludes aspects more suited for operation through standard compute nodes 130, and can leverage remote resources for aspects performed locally by standard compute nodes 130. Further, lightweight management container 112 can include or exclude particular interfaces for edge device capability. These interfaces can be included in all lightweight management containers, or be tailored to specific edge devices among edge devices 140 (based on, e.g., processing power, memory available, connection speeds, the presence or absence of sensors such as cameras, microphones, location systems, and so forth). In embodiments, lightweight management container 112 translates requirements (e.g., as would be associated with deployment of a virtual machine to a traditional compute node) to what can be provided by the edge device and deployed via lightweight management container 112. Non-requirements for the particular edge device use that might be included in standard management container 114 can be omitted or removed rather than translated.

Lightweight management container 112 can be provided full services associated with the cloud architecture, including access to virtual networks that can be configured on a per-application basis. Virtual networks can be configured to provide container instances with private connectivity with other containers and/or virtual machines. Virtual Local Area Network (VLAN) and Virtual Extensible Local Area Network (VXLAN) overlays can be supported. Further, edge node communications can be conducted through an Internet Protocol Security tunnel which can connect edge nodes to cloud nodes running virtual routers to enable internet protocol routing between virtual networks.

Standard management container 114 can be deployed, using extension component 110 or other cloud elements, to standard compute nodes 130. Standard compute nodes 130 can be dedicated computing devices providing resources to hybrid cloud network 120, such as servers, arrays of servers, and other semi-static resources having greater resources than edge devices. Standard management container 114 includes a full suite of services, applications, et cetera, for use in or by hybrid cloud network 120 or its clients.

As suggested, lightweight management container 112 can in fact be a plurality of lightweight management containers, which can configured differently before deployment or allow an edge device receiving lightweight management container 112 to add or decline particular modules of lightweight management container 112 based on its capabilities. In the first example above, different lightweight management containers can be associated with extension component 110, which deploys a corresponding management container based on the edge device receiving lightweight management container 112. In the second example; a common lightweight management container 112 is provided which can source and add additional modules associated with device capability based on the resources and behavior of an edge device after initial deployment.

In embodiments, lightweight management container 112 can include monitor component 118. In alternative or complementary embodiments, extension component 110 can include monitor component 118. Monitor component 118 can be used to monitor at least edge devices 140 for changes. Because edge devices 140 are not dedicated resources like standard compute nodes 130, their availability and resources may vary in a manner that renders them effective or inoperable for cloud purposes. Monitor component 118 can therefore monitor factors such as location, movement, connectivity and connection speed, processor usage, available memory, sensor utilization (e.g., whether camera or microphone is in use for a local process), et cetera, and determine whether a particular edge device can meet a request or requirement based on these possibly constraining factors. In embodiments, monitor component 118 can also be deployed to, or interact with, standard compute nodes 130 to monitor availability and performance of their resources as well.

Extension component 110 also include conductor component 116. Conductor component 116 can control communication and interaction to, with, and between edge devices 140 and standard compute nodes 130 to accomplish tasks delegated to or within hybrid cloud network 120. Conductor component 116 can direct tasking or traffic to one or more edge devices of edge devices 140 and/or one or more standard compute nodes of compute nodes 130 to complete client tasks, serve or store information, run applications or other processing, relay information, complete cloud tasks (e.g., management and administration of hybrid cloud network 120), collect or generate information (e.g., from sensors), and so forth. This direction can be based on a combination of the availability and capability of edge devices 140, as well as algorithms for managing traffic and tasking within cloud networks. Conductor component 116 can include constraint-solving algorithms to determine enrollment, tasking, et cetera, with reference to edge devices 140.

Communication between extension component 110, standard compute nodes 130, and edge devices 140 can be conducted according to ad hoc techniques or long range techniques. WiFi networks and other short- to medium-range wireless communication techniques can be characterized as ad hoc techniques. Long range techniques can employ cellular networks (as discussed herein) or other wireless techniques emphasizing mobility of connected elements.

While aspects of system 100 are shown as discrete components located or associated with or at particular places, it is understood that, in view of the disclosures herein, other arrangements are readily embraced within the scope of the disclosure. For example, particular components can be distributed across multiple locations or arranged remotely with respect to the illustrated embodiment so long as the components can still perform the cooperative aspects described herein. Further, while extension component 110 is shown outside of hybrid cloud network 120, it is understood extension component 110 can be located in hybrid cloud network 120, or otherwise arranged logically or using physical components in any location to accomplish the aspects noted herein.

While only one element of each component type is shown in some aspects of FIG. 1, and multiples are shown for others (e.g., three standard compute nodes, three edge devices), the illustrated numbers are provided for ease of description only, and more or fewer components can be included without departing from the scope of the disclosure. Further, multiples of any component, device, node, et cetera, can be the same or different (e.g., dozens of edge devices with dozens of different types or models).

System 100 can include or interact with a variety of application programming interfaces (APIs) to enable interoperability with the cloud or its clients. Metadata can be included with stored data or transmissions to establish tags or identifiers to aid in the use and querying of cloud resources in the hybrid cloud including a diverse variety of node types having different capabilities and functionality.

Without limiting the disclosure, but for ease of explanation, one possible technique for creating a hybrid cloud includes modifying an OpenStack® cloud environment to interoperate with Docker® containers for edge nodes and the OpenStack Nova compute service on traditional compute nodes. OpenStack Neutron can provide a network layer. A messaging platform can be provided by the Advanced Message Queue Protocol as implemented by, e.g., RabbitMQ®. This can allow not only direct messaging to specific nodes or elements but multicasting to groups or classes of nodes or elements. An example of a task delegated using this architecture could be leveraging multiple edge devices to run a Hadoop® microcluster. While these solutions are discussed here to provide a generalization of functionality, customization and supplementation can accomplish the interoperable hybrid cloud architecture not provided by such solutions as offered by their respective developers. Even with the presence of traditional compute nodes, it is infeasible to deploy some existing products to a hybrid cloud as the volume and variety of edge devices could overwhelm traditional cloud systems in lieu of the ability to characterize, constrain, filter, and distribute element monitoring and tasking. Identification and selection criteria and algorithms can facilitate scalability and elasticity in hybrid clouds having a variety of edge nodes and edge node types.

An example filtering or constraining technique can take into consideration the location and disposition of particular edge devices among edge device 140. A location-based situational awareness component within a hybrid cloud can utilize geographically-addressed transmissions to find edge devices in or around certain locations. Their rates of travel, connectivity, battery levels, local use, sensor capability, et cetera can be used to further filter and constrain the set of edge devices for cloud use regarding any given task.

Figure 2:
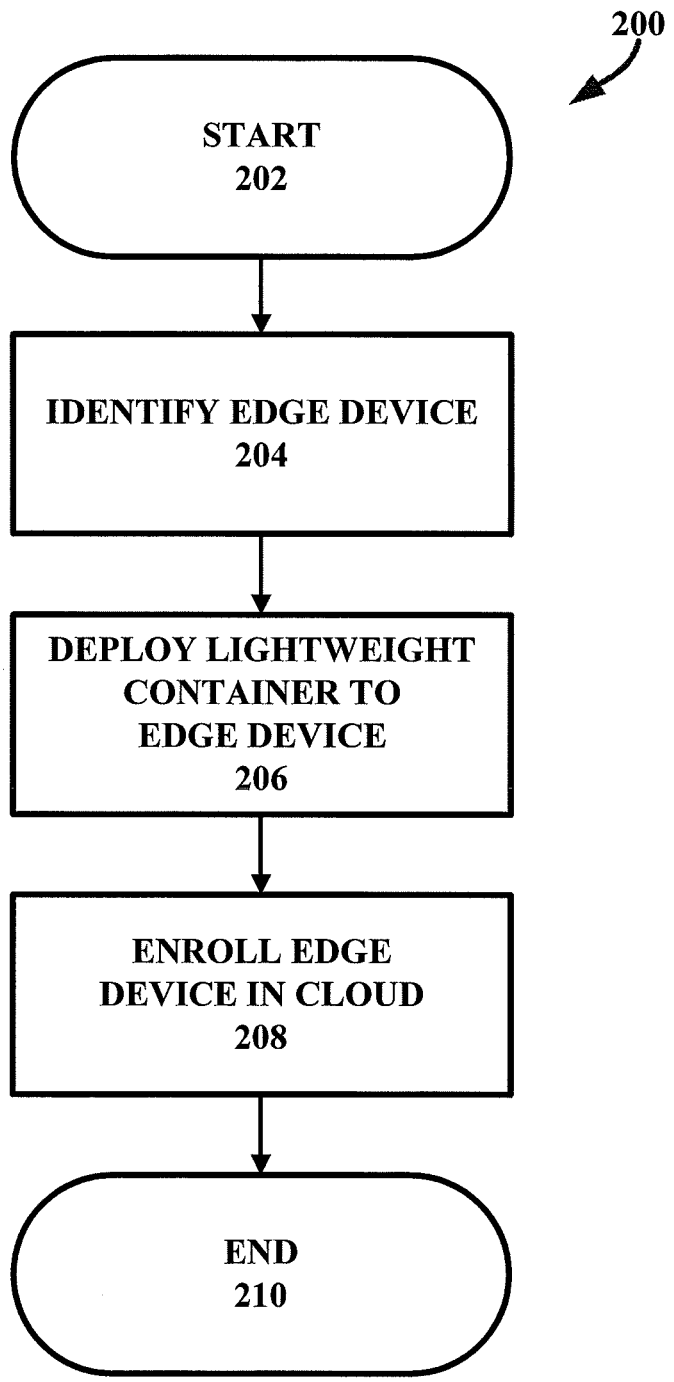
FIG. 2 illustrates an example methodology in accordance with the disclosure.

With this example arrangement understood, FIG. 2 illustrates an example methodology 200 for creating or managing a hybrid cloud. Methodology 200 begins at 202 and proceeds to 204 where an edge device is identified. In an embodiment, an extension component or other cloud management component can identify the edge device. The edge device can be identified based on its connectivity to a hybrid cloud or a node within a hybrid cloud, or because it controls a resource (e.g., processor time, memory, bandwidth, a sensor) which can be used (and may be needed) by a hybrid cloud to perform tasks.

Once an edge device is identified, at 206, a lightweight management container is deployed to the edge device. The lightweight management container functions interoperably with standard management containers, but inflicts lower resource consumption on the edge device than a standard management container. In an embodiment, prior to deploying a lightweight management container, permission or authorization to deploy the lightweight management container to the edge node can be confirmed or requested in view of the possibility that the edge device is not owned or controlled by the same entity which owns or controls other portions of the hybrid cloud.

At 208, the edge device is enrolled in the hybrid cloud using the lightweight management container. Enrollment can include adding the edge device's resources to a database or list of available resources for use, monitoring the edge device for factors influencing its ability to perform cloud tasks, enabling clients or management elements to assign or task the edge device, and so forth.

At 210, methodology 200 ends with the edge device enrolled in and available to the hybrid cloud and elements in communication therewith or there-through.

Figure 3:
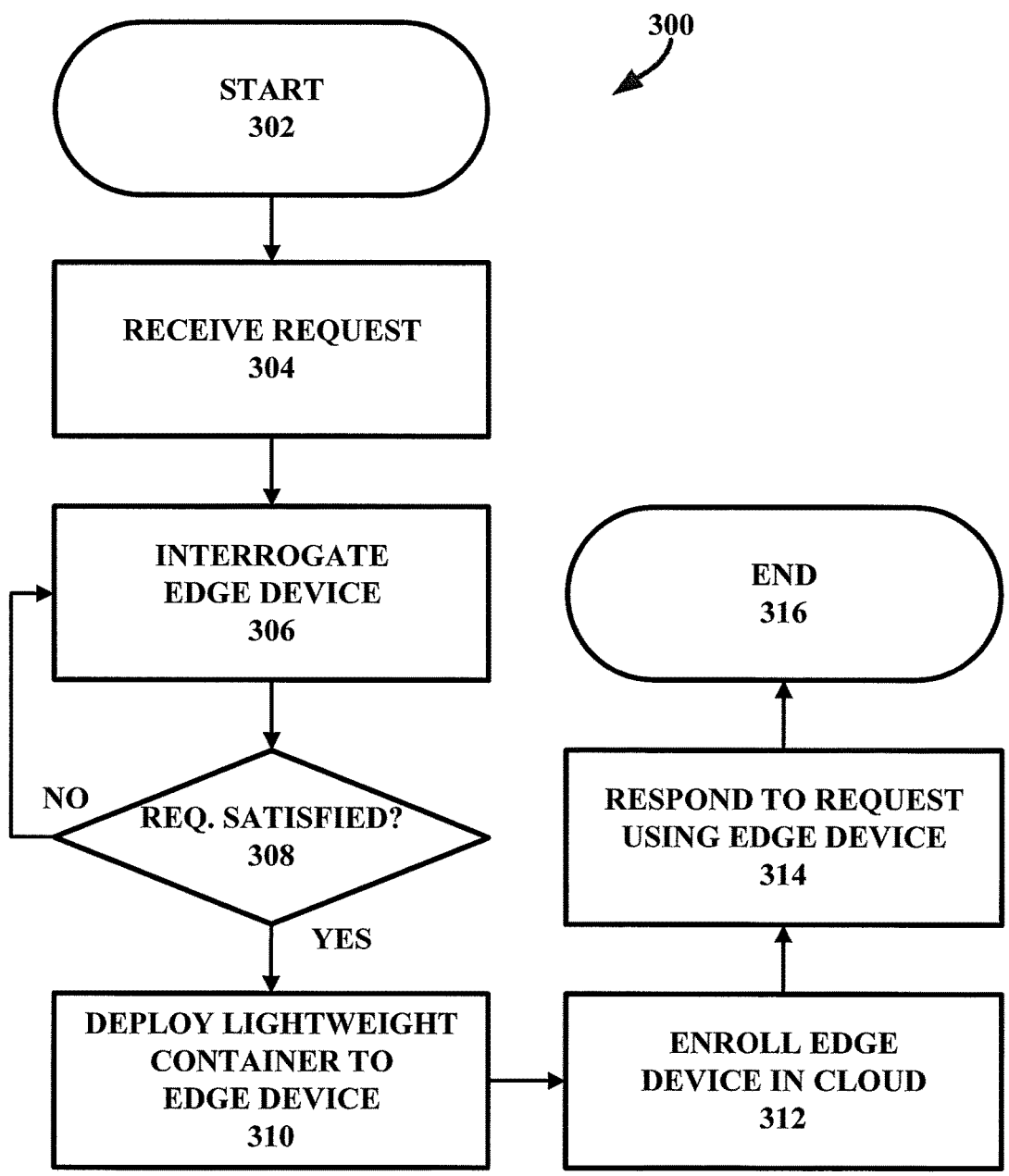
FIG. 3 illustrates an example methodology in accordance with the disclosure.

FIG. 3 illustrates another example methodology 300 for creating or managing a hybrid cloud. Methodology 300 can be query-based (e.g., seeking edge devices to satisfy a particular request from a cloud network) in its enrollment or assignment of edge devices. In this regard, methodology 300 begins at 302 and proceeds to 304 where a request is received. The request can be a query or other request for information or resources. Based on the requirements of the request, at 306, one or more edge devices can be interrogated to determine whether they are able to satisfy the request (or contribute to its satisfaction). Edge devices for interrogation can be identified based on resources, location, usage, connectivity, etcetera.

A determination is made at 308 as to whether identified edge device(s) identified satisfy the requirements of the request. If the determination at 308 returns negative, methodology 300 recycles to 306 where additional edge devices can be interrogated. If the determination at 308 returns positive, methodology proceeds to 310 where a lightweight management container can be deployed to the edge device.

With the lightweight management container deployed to the edge device, the edge device can be enrolled in the hybrid cloud at 312. Thereafter, at 314, the now-enrolled edge device in the hybrid cloud can respond to the request, and methodology 300 then ends at 316.

While methodology 300 describes deployment of a lightweight management container to an edge device, in alternative embodiments the edge device may be previously enrolled in the cloud with the lightweight management container deployed earlier. In such an alternative embodiment, 310 and 312 may be omitted. In another alternative embodiment, a task-related container or additional module can be deployed to the edge device, supplementing the existing lightweight management container or creating an instance of a particular process to enable capability or control commensurate with the requirements of the request to be satisfied.

FIGS. 4-12 show example architectures including communication devices (which can be edge devices), and techniques for enabling communication therebetween.

Figure 4:
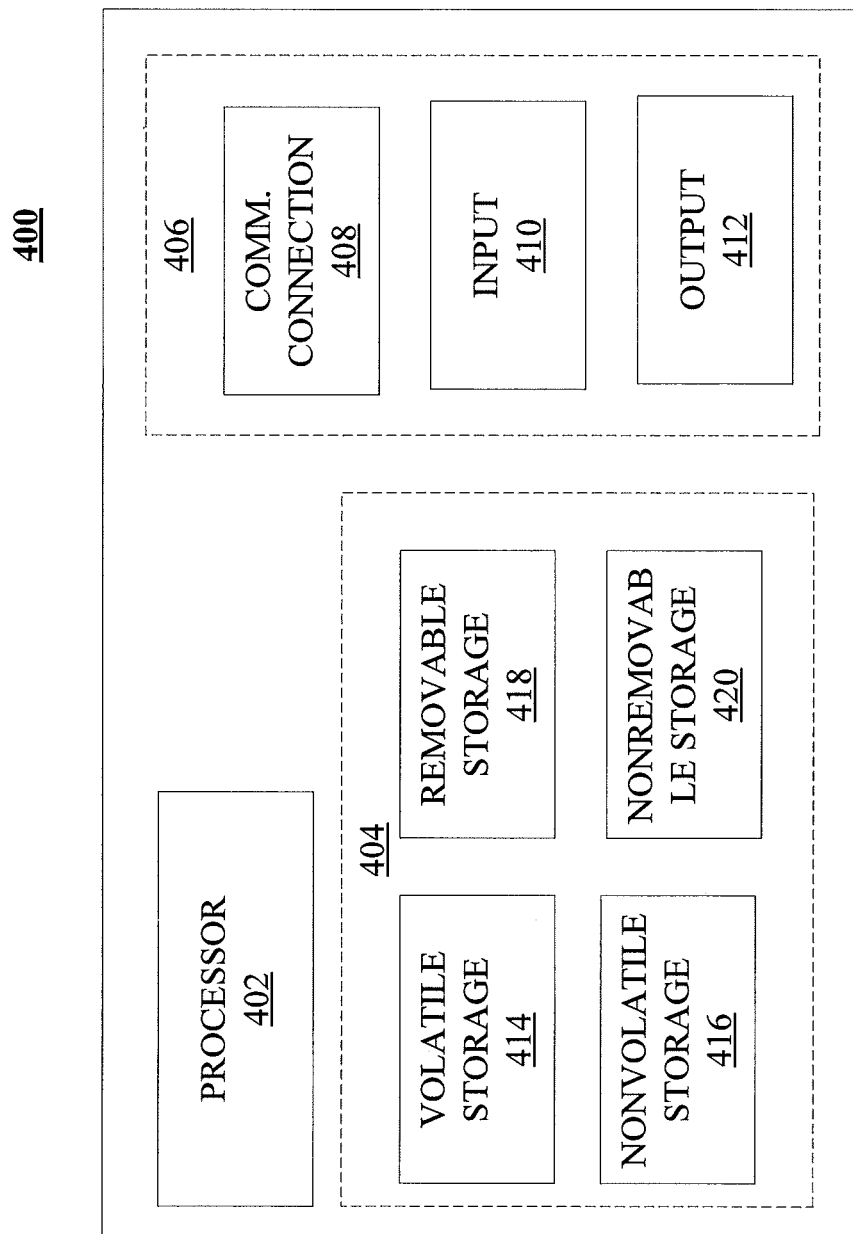
FIG. 4 is a schematic of an exemplary network device.

In this regard, FIG. 4 is a block diagram of network device 400 that may be connected to or comprise a component of cellular network, wireless network, or other network. Network device 400 may comprise hardware or a combination of hardware and software. The functionality to facilitate telecommunications via a telecommunications network may reside in one or combination of network devices 400. Network device 400 depicted in FIG. 4 may represent or perform functionality of an appropriate network device 400, or combination of network devices 400, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 400 may comprise a processor 402 and a memory 404 coupled to processor 402. Memory 404 may contain executable instructions that, when executed by processor 402, cause processor 402 to effectuate operations associated with mapping wireless signal strength. As evident from the description herein, network device 400 is not to be construed as software per se.

In addition to processor 402 and memory 404, network device 400 may include an input/output system 406. Processor 402, memory 404, and input/output system 406 may be coupled together (coupling not shown in FIG. 4) to allow communications therebetween. Each portion of network device 400 may comprise circuitry for performing functions associated with each respective portion. Thus, each portion may comprise hardware, or a combination of hardware and software. Accordingly, each portion of network device 400 is not to be construed as software per se. Input/output system 406 may be capable of receiving or providing information from or to a communications device or other network entities configured for telecommunications. For example input/output system 406 may include a wireless communications (e.g., 3G/4G/GPS) card. Input/output system 406 may be capable of receiving or sending video information, audio information, control information, image information, data, or any combination thereof. Input/output system 406 may be capable of transferring information with network device 400. In various configurations, input/output system 406 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 406 may comprise a Wi-Fi finder, a two-way GPS chipset or equivalent, or the like, or a combination thereof.

Input/output system 406 of network device 400 also may contain a communication connection 408 that allows network device 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 406 also may include an input device 410 such as keyboard, mouse, pen, voice input device, or touch input device. Input/output system 406 may also include an output device 412, such as a display, speakers, or a printer.

Processor 402 may be capable of performing functions associated with telecommunications, such as functions for processing broadcast messages, as described herein. For example, processor 402 may be capable of, in conjunction with any other portion of network device 400, determining a type of broadcast message and acting according to the broadcast message type or content, as described herein.

Memory 404 of network device 400 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of RAM), a nonvolatile storage 416 (such as ROM, flash memory), or a combination thereof. Memory 404 may include additional storage (e.g., a removable storage 418 or a nonremovable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 400. Memory 404 may comprise executable instructions that, when executed by processor 402, cause processor 402 to effectuate operations to map signal strengths in an area of interest.

Figure 5:
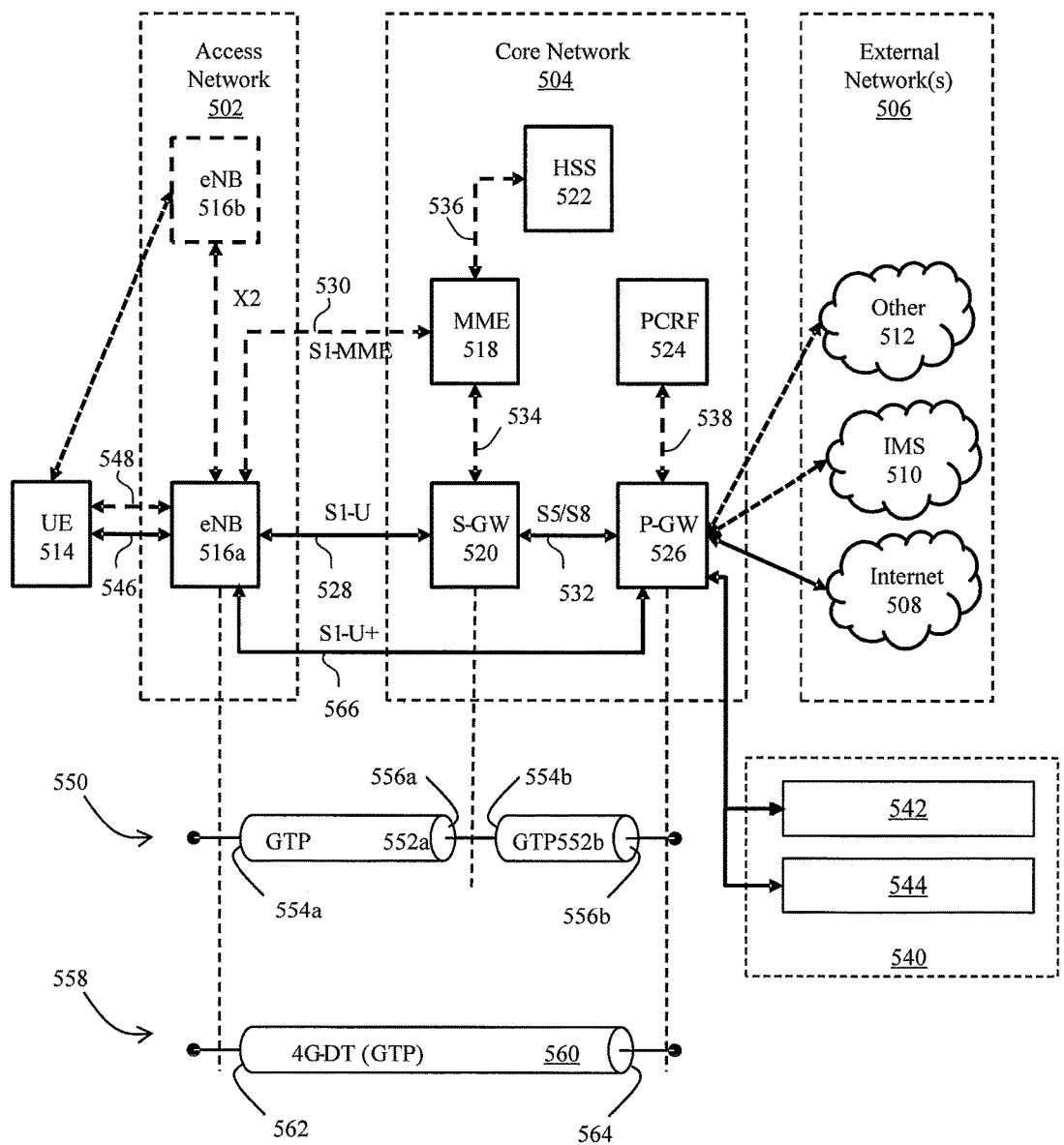
FIG. 5 depicts an exemplary communication system that provide wireless telecommunication services over wireless communication networks.

FIG. 5 illustrates a functional block diagram depicting one example of an LTE-EPS network architecture 500 related to the current disclosure. In particular, the network architecture 500 disclosed herein is referred to as a modified LTE-EPS architecture 500 to distinguish it from a traditional LTE-EPS architecture.

An example modified LTE-EPS architecture 500 is based at least in part on standards developed by the 3rd Generation Partnership Project (3GPP), with information available at www.3gpp.org. In one embodiment, the LTE-EPS network architecture 500 includes an access network 502, a core network 504, e.g., an EPC or Common BackBone (CBB) and one or more external networks 506, sometimes referred to as PDN or peer entities. Different external networks 506 can be distinguished from each other by a respective network identifier, e.g., a label according to DNS naming conventions describing an access point to the PDN. Such labels can be referred to as Access Point Names (APN). External networks 506 can include one or more trusted and non-trusted external networks such as an internet protocol (IP) network 508, an IP multimedia subsystem (IMS) network 510, and other networks 512, such as a service network, a corporate network, or the like.

Access network 502 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 502 can include one or more communication devices, commonly referred to as UE 514, and one or more wireless access nodes, or base stations 516a, 516b. During network operations, at least one base station 516 communicates directly with UE 514. Base station 516 can be an evolved Node B (e-NodeB), with which UE 514 communicates over the air and wirelessly. UEs 514 can include, without limitation, wireless devices, e.g., satellite communication systems, portable digital assistants (PDAs), laptop computers, tablet devices and other mobile devices (e.g., cellular telephones, smart appliances, and so on). UEs 514 can connect to eNBs 516 when UE 514 is within range according to a corresponding wireless communication technology.

UE 514 generally runs one or more applications that engage in a transfer of packets between UE 514 and one or more external networks 506. Such packet transfers can include one of downlink packet transfers from external network 506 to UE 514, uplink packet transfers from UE 514 to external network 506 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 504, e.g., according to parameters, such as the QoS.

Core network 504 uses a concept of bearers, e.g., EPS bearers, to route packets, e.g., IP traffic, between a particular gateway in core network 504 and UE 514. A bearer refers generally to an IP packet flow with a defined QoS between the particular gateway and UE 514. Access network 502, e.g., E UTRAN, and core network 504 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 504 includes various network entities, such as MME 518, SGW 520, Home Subscriber Server (HSS) 522, Policy and Charging Rules Function (PCRF) 524 and PGW 526. In one embodiment, MME 518 comprises a control node performing a control signaling between various equipment and devices in access network 502 and core network 504. The protocols running between UE 514 and core network 504 are generally known as Non-Access Stratum (NAS) protocols.

For illustration purposes only, the terms MME 518, SGW 520, HSS 522 and PGW 526, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 520 routes and forwards all user data packets. SGW 520 also acts as a mobility anchor for user plane operation during handovers between base stations, e.g., during a handover from first eNB 516*a* to second eNB 516*b* as may be the result of UE 514 moving from one area of coverage, e.g., cell, to another. SGW 520 can also terminate a downlink data path, e.g., from external network 506 to UE 514 in an idle state, and trigger a paging operation when downlink data arrives for UE 514. SGW 520 can also be configured to manage and store a context for UE 514, e.g., including one or more of parameters of the IP bearer service and network internal routing information. In addition, SGW 520 can perform administrative functions, e.g., in a visited network, such as collecting information for charging (e.g., the volume of data sent to or received from the user), and/or replicate user traffic, e.g., to support a lawful interception. SGW 520 also serves as the mobility anchor for interworking with other 3GPP technologies such as universal mobile telecommunication system (UMTS).

At any given time, UE 514 is generally in one of three different states: detached, idle, or active. The detached state is typically a transitory state in which UE 514 is powered on but is engaged in a process of searching and registering with network 502. In the active state, UE 514 is registered with access network 502 and has established a wireless connection, e.g., radio resource control (RRC) connection, with eNB 516. Whether UE 514 is in an active state can depend on the state of a packet data session, and whether there is an active packet data session. In the idle state, UE 514 is generally in a power conservation state in which UE 514 typically does not communicate packets. When UE 514 is idle, SGW 520 can terminate a downlink data path, e.g., from one peer entity 506, and triggers paging of UE 514 when data arrives for UE 514. If UE 514 responds to the page, SGW 520 can forward the IP packet to eNB 516*a*.

HSS 522 can manage subscription-related information for a user of UE 514. For example, tHSS 522 can store information such as authorization of the user, security requirements for the user, quality of service (QoS) requirements for the user, etc. HSS 522 can also hold information about external networks 506 to which the user can connect, e.g., in the form of an APN of external networks 506. For example, MME 518 can communicate with HSS 522 to determine if UE 514 is authorized to establish a call, e.g., a voice over IP (VoIP) call before the call is established.

PCRF 524 can perform QoS management functions and policy control. PCRF 524 is responsible for policy control decision-making, as well as for controlling the flow-based charging functionalities in a policy control enforcement function (PCEF), which resides in PGW 526. PCRF 524 provides the QoS authorization, e.g., QoS class identifier and bit rates that decide how a certain data flow will be treated in the PCEF and ensures that this is in accordance with the user's subscription profile.

PGW 526 can provide connectivity between the UE 514 and one or more of the external networks 506. In illustrative network architecture 500, PGW 526 can be responsible for IP address allocation for UE 514, as well as one or more of QoS enforcement and flow-based charging, e.g., according to rules from the PCRF 524. PGW 526 is also typically responsible for filtering downlink user IP packets into the different QoS-based bearers. In at least some embodiments, such filtering can be performed based on traffic flow templates. PGW 526 can also perform QoS enforcement, e.g., for guaranteed bit rate bearers. PGW 526 also serves as a mobility anchor for interworking with non-3GPP technologies such as CDMA2000.

Within access network 502 and core network 504 there may be various bearer paths/interfaces, e.g., represented by solid lines 528 and 530. Some of the bearer paths can be referred to by a specific label. For example, solid line 528 can be considered an S1-U bearer and solid line 532 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 504 can include various signaling bearer paths/interfaces, e.g., control plane paths/interfaces represented by dashed lines 530, 534, 536, and 538. Some of the signaling bearer paths may be referred to by a specific label. For example, dashed line 530 can be considered as an S1-MME signaling bearer, dashed line 534 can be considered as an S11 signaling bearer and dashed line 536 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 566. In the illustrative example, the S1-U+ user plane interface extends between the eNB 516*a* and PGW 526. Notably, S1-U+ path/interface does not include SGW 520, a node that is otherwise instrumental in configuring and/or managing packet forwarding between eNB 516*a* and one or more external networks 506 by way of PGW 526. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 520, 526 due to excessive handover events.

In some embodiments, PGW 526 is coupled to storage device 540, shown in phantom. Storage device 540 can be integral to one of the network nodes, such as PGW 526, for example, in the form of internal memory and/or disk drive. It is understood that storage device 540 can include registers suitable for storing address values. Alternatively or in addition, storage device 540 can be separate from PGW 526, for example, as an external hard drive, a flash drive, and/or network storage.

Storage device 540 selectively stores one or more values relevant to the forwarding of packet data. For example, storage device 540 can store identities and/or addresses of network entities, such as any of network nodes 518, 520, 522, 524, and 526, eNBs 516 and/or UE 514. In the illustrative example, storage device 540 includes a first storage location 542 and a second storage location 544. First storage location 542 can be dedicated to storing a Currently Used Downlink address value 542. Likewise, second storage location 544 can be dedicated to storing a Default Downlink Forwarding address value 544. PGW 526 can read and/or write values into either of storage locations 542, 544, for example, managing Currently Used Downlink Forwarding address value 542 and Default Downlink Forwarding address value 544 as disclosed herein.

In some embodiments, the Default Downlink Forwarding address for each EPS bearer is the SGW S5-U address for each EPS Bearer. The Currently Used Downlink Forwarding address" for each EPS bearer in PGW 526 can be set every time when PGW 526 receives an uplink packet, e.g., a GTP-U uplink packet, with a new source address for a corresponding EPS bearer. When UE 514 is in an idle state, the "Current Used Downlink Forwarding address" field for each EPS bearer of UE 514 can be set to a "null" or other suitable value.

In some embodiments, the Default Downlink Forwarding address is only updated when PGW 526 receives a new SGW S5-U address in a predetermined message or messages. For example, the Default Downlink Forwarding address is only updated when PGW 526 receives one of a Create Session Request, Modify Bearer Request and Create Bearer Response messages from SGW 520.

As values 542, 544 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 502 and core network 504 are illustrated in a simplified block diagram in FIG. 5. In other words, either or both of access network 502 and the core network 504 can include additional network elements that are not shown, such as various routers, switches and controllers. In addition, although FIG. 5 illustrates only a single one of each of the various network elements, it should be noted that access network 502 and core network 504 can include any number of the various network elements. For example, core network 504 can include a pool (i.e., more than one) of MMEs 518, SGWs 520 or PGWs 526.

In the illustrative example, data traversing a network path between UE 514, eNB 516a, SGW 520, PGW 526 and external network 506 may be considered to constitute data transferred according to an end-to-end IP service. However, for the present disclosure, to properly perform establishment management in LTE-EPS network architecture 500, the core network, data bearer portion of the end-to-end IP service is analyzed.

An establishment may be defined herein as a connection set up request between any two elements within LTE-EPS network architecture 500. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 546) between UE 514 and eNB 516a, a second portion (e.g., an S1 data bearer 528) between eNB 516a and SGW 520, and a third portion (e.g., an S5/S8 bearer 532) between SGW 520 and PGW 526. Various signaling bearer portions are also illustrated in FIG. 5. For example, a first signaling portion (e.g., a signaling radio bearer 548) between UE 514 and eNB 516a, and a second signaling portion (e.g., S1 signaling bearer 530) between eNB 516a and MME 518.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 500, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 550 includes a first tunnel 552a between two tunnel endpoints 554a and 556a, and a second tunnel 552b between two tunnel endpoints 554b and 556b. In the illustrative example, first tunnel 552a is established between eNB 516a and SGW 520. Accordingly, first tunnel 552a includes a first tunnel endpoint 554a corresponding to an S1-U address of eNB 516a (referred to herein as the eNB S1-U address), and second tunnel endpoint 556a corresponding to an S1-U address of SGW 520 (referred to herein as the SGW S1-U address). Likewise, second tunnel 552b includes first tunnel endpoint 554b corresponding to an S5-U address of SGW 520 (referred to herein as the SGW S5-U address), and second tunnel endpoint 556b corresponding to an S5-U address of PGW 526 (referred to herein as the PGW S5-U address).

In at least some embodiments, first tunnel solution 550 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 558 includes a single or direct tunnel 560 between tunnel endpoints 562 and 564. In the illustrative example, direct tunnel 560 is established between eNB 516a and PGW 526, without subjecting packet transfers to processing related to SGW 520. Accordingly, direct tunnel 560 includes first tunnel endpoint 562 corresponding to the eNB S1-U address, and second tunnel endpoint 564 corresponding to the PGW S5-U address. Packet data received at either end can be encapsulated into a payload and directed to the corresponding address of the other end of the tunnel. Such direct tunneling avoids processing, e.g., by SGW 520 that would otherwise relay packets between the same two endpoints, e.g., according to a protocol, such as the GTP-U protocol.

In some scenarios, direct tunneling solution 558 can forward user plane data packets between eNB 516a and PGW 526, by way of SGW 520. That is, SGW 520 can serve a relay function, by relaying packets between two tunnel endpoints 516a, 526. In other scenarios, direct tunneling solution 558 can forward user data packets between eNB 516a and PGW 526, by way of the S1 U+ interface, thereby bypassing SGW 520.

Generally, UE 514 can have one or more bearers at any one time. The number and types of bearers can depend on applications, default requirements, and so on. It is understood that the techniques disclosed herein, including the configuration, management and use of various tunnel solutions 550, 558, can be applied to the bearers on an individual bases. That is, if user data packets of one bearer, say a bearer associated with a VoIP service of UE 514, then the forwarding of all packets of that bearer are handled in a similar manner. Continuing with this example, the same UE 514 can have another bearer associated with it through the same eNB 516*a*. This other bearer, for example, can be associated with a relatively low rate data session forwarding user data packets through core network 504 simultaneously with the first bearer. Likewise, the user data packets of the other bearer are also handled in a similar manner, without necessarily following a forwarding path or solution of the first bearer. Thus, one of the bearers may be forwarded through direct tunnel 558; whereas, another one of the bearers may be forwarded through a two-tunnel solution 550.

Figure 6:
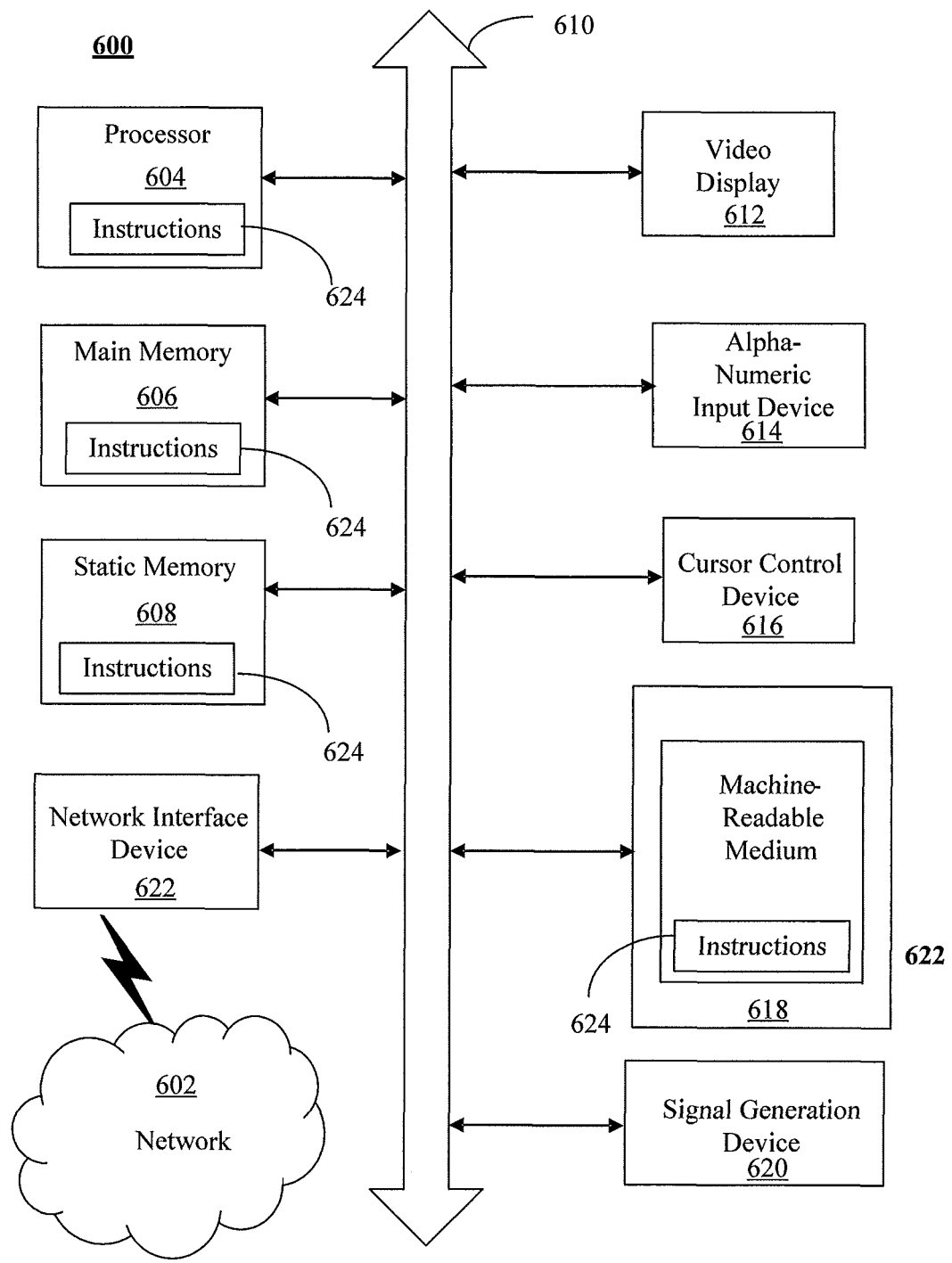
FIG. 6 depicts an exemplary communication system that provide wireless telecommunication services over wireless communication networks.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as processor 302, UE 514, eNB 516, MME 518, SGW 520, HSS 522, PCRF 524, PGW 526 and other devices. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the embodiments described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium 624 on which is stored one or more sets of instructions (e.g., software 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

Figure 7:
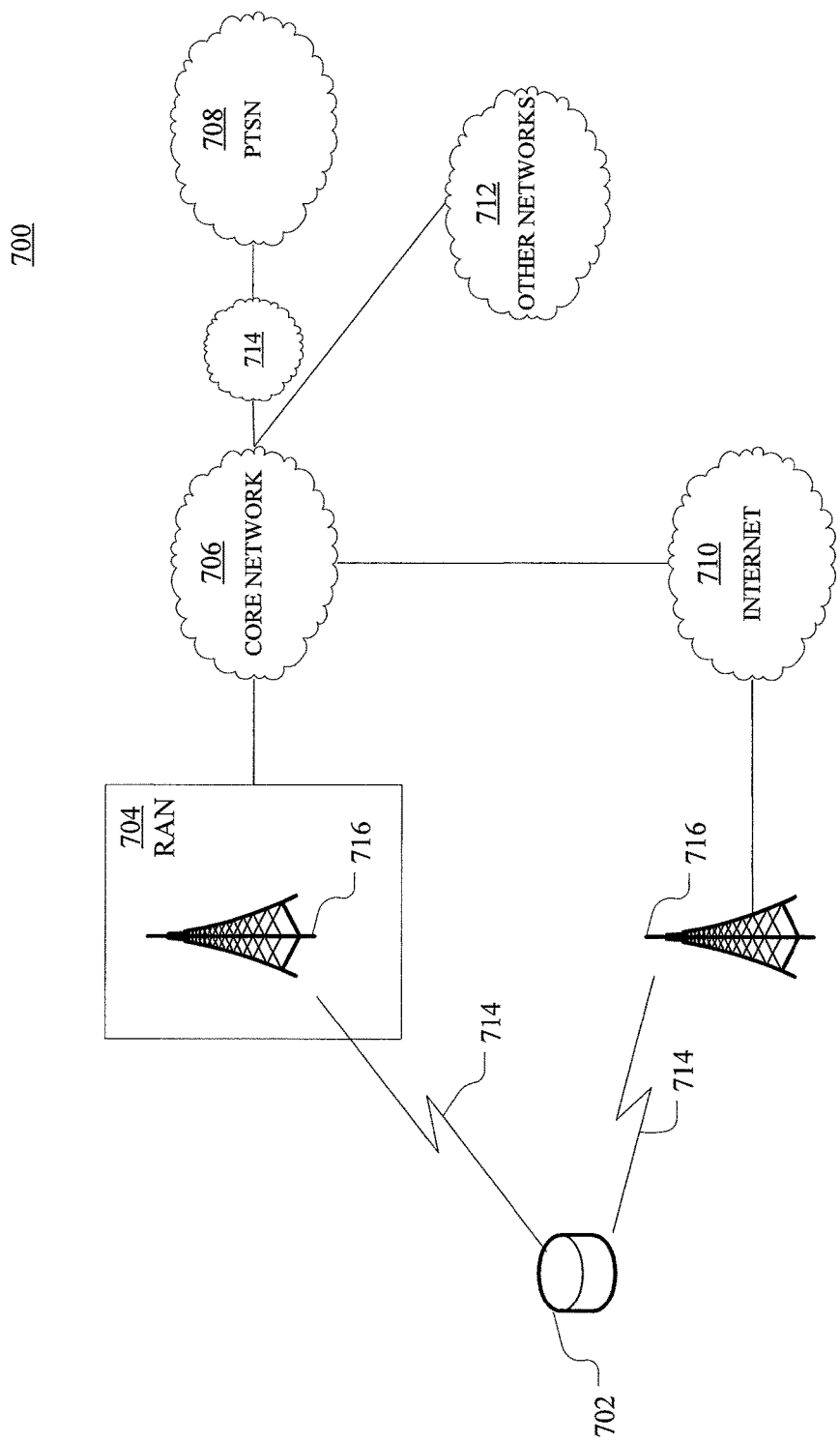
FIG. 7 is a diagram of an exemplary telecommunications system in which the disclosed methods and processes may be implemented.

As shown in FIG. 7, telecommunication system 700 may include wireless transmit/receive units (WTRUs) 702, a RAN 704, a core network 706, a public switched telephone network (PSTN) 708, the Internet 710, or other networks 712, though it will be appreciated that the disclosed examples contemplate any number of WTRUs, base stations, networks, or network elements. Each WTRU 702 may be any type of device configured to operate or communicate in a wireless environment. For example, a WTRU may comprise a mobile device, network device 400, or the like, or any combination thereof. By way of example, WTRUs 702 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 702 may be configured to transmit or receive wireless signals over an air interface 714.

Telecommunication system 700 may also include one or more base stations 716. Each of base stations 716 may be any type of device configured to wirelessly interface with at least one of the WTRUs 702 to facilitate access to one or more communication networks, such as core network 706, PTSN 708, Internet 710, or other networks 712. By way of example, base stations 716 may be a base transceiver station (BTS), a Node-B, an eNode B, a Home Node B, a Home eNode B, a site controller, an access point (AP), a wireless router, or the like. While base stations 716 are each depicted as a single element, it will be appreciated that base stations 716 may include any number of interconnected base stations or network elements.

RAN 704 may include one or more base stations 716, along with other network elements (not shown), such as a base station controller (BSC), a radio network controller (RNC), or relay nodes. One or more base stations 716 may be configured to transmit or receive wireless signals within a particular geographic region, which may be referred to as a cell (not shown). The cell may further be divided into cell sectors. For example, the cell associated with base station 716 may be divided into three sectors such that base station 716 may include three transceivers: one for each sector of the cell. In another example, base station 716 may employ multiple-input multiple-output (MIMO) technology and, therefore, may utilize multiple transceivers for each sector of the cell.

Base stations 716 may communicate with one or more of WTRUs 702 over air interface 714, which may be any suitable wireless communication link (e.g., RF, microwave, infrared (IR), ultraviolet (UV), or visible light). Air interface 714 may be established using any suitable radio access technology (RAT).

More specifically, as noted above, telecommunication system 700 may be a multiple access system and may employ one or more channel access schemes, such as CDMA, TDMA, FDMA, OFDMA, SC-FDMA, or the like. For example, base station 716 in RAN 704 and WTRUs 702 connected to RAN 704 may implement a radio technology such as Universal Mobile Telecommunications System (UMTS) Terrestrial Radio Access (UTRA) that may establish air interface 714 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 716 and WTRUs 702 that are connected to RAN 704 may implement a radio technology such as Evolved UMTS Terrestrial Radio Access (E-UTRA), which may establish air interface 714 using LTE or LTE-Advanced (LTE-A).

Optionally base station 716 and WTRUs 702 connected to RAN 704 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like. Base station 716 may be a wireless router, Home Node B, Home eNode B, or access point, for example, and may utilize any suitable RAT for facilitating wireless connectivity in a localized area, such as a place of business, a home, a vehicle, a campus, or the like. For example, base station 716 and associated WTRUs 702 may implement a radio technology such as IEEE 602.11 to establish a wireless local area network (WLAN). As another example, base station 716 and associated WTRUs 702 may implement a radio technology such as IEEE 602.15 to establish a wireless personal area network (WPAN). In yet another example, base station 716 and associated WTRUs 702 may utilize a cellular-based RAT (e.g., WCDMA, CDMA2000, GSM, LTE, LTE-A, etc.) to establish a picocell or femtocell. As shown in FIG. 7, base station 716 may have a direct connection to Internet 710. Thus, base station 716 may not be required to access Internet 710 via core network 706.

RAN 704 may be in communication with core network 706, which may be any type of network configured to provide voice, data, applications, and/or voice over internet protocol (VoIP) services to one or more WTRUs 702. For example, core network 706 may provide call control, billing services, mobile location-based services, pre-paid calling, Internet connectivity, video distribution or high-level security functions, such as user authentication. Although not shown in FIG. 7, it will be appreciated that RAN 704 or core network 706 may be in direct or indirect communication with other RANs that employ the same RAT as RAN 704 or a different RAT. For example, in addition to being connected to RAN 704, which may be utilizing an E-UTRA radio technology, core network 706 may also be in communication with another RAN (not shown) employing a GSM radio technology.

Core network 706 may also serve as a gateway for WTRUs 702 to access PSTN 708, Internet 710, or other networks 712. PSTN 708 may include circuit-switched telephone networks that provide plain old telephone service (POTS). For LTE core networks, core network 706 may use IMS core 714 to provide access to PSTN 708. Internet 710 may include a global system of interconnected computer networks or devices that use common communication protocols, such as the transmission control protocol (TCP), user datagram protocol (UDP), or IP in the TCP/IP internet protocol suite. Other networks 712 may include wired or wireless communications networks owned or operated by other service providers. For example, other networks 712 may include another core network connected to one or more RANs, which may employ the same RAT as RAN 704 or a different RAT.

Some or all WTRUs 702 in telecommunication system 700 may include multi-mode capabilities. That is, WTRUs 702 may include multiple transceivers for communicating with different wireless networks over different wireless links. For example, one or more WTRUs 702 may be configured to communicate with base station 716, which may employ a cellular-based radio technology, and with base station 716, which may employ an IEEE 802 radio technology.

Figure 8:
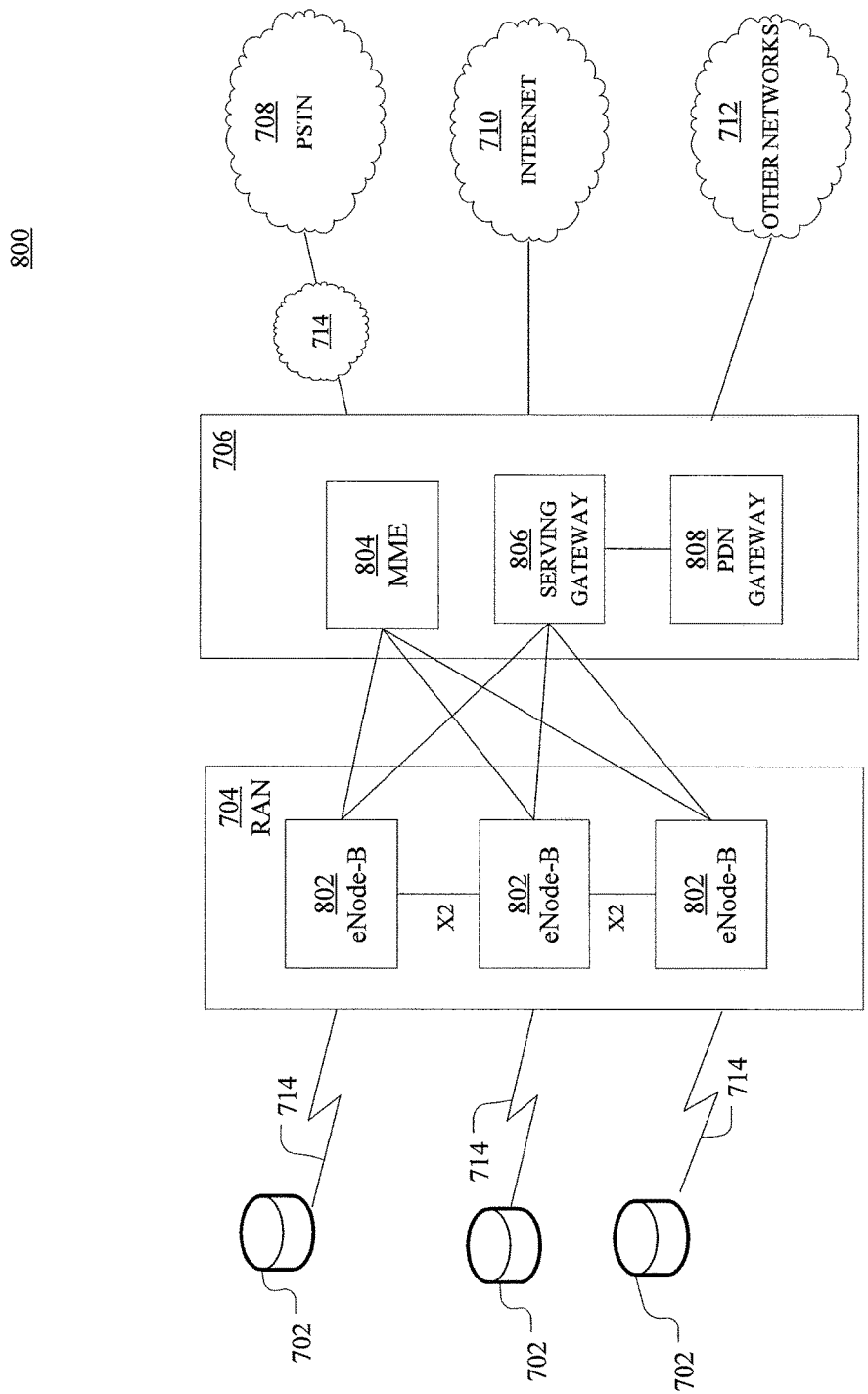
FIG. 8 is an example system diagram of a radio access network and a core network.

FIG. 8 is an example system 800 including RAN 704 and core network 706. As noted above, RAN 704 may employ an E-UTRA radio technology to communicate with WTRUs 702 over air interface 714. RAN 704 may also be in communication with core network 706.

RAN 704 may include any number of eNode-Bs 802 while remaining consistent with the disclosed technology. One or more eNode-Bs 802 may include one or more transceivers for communicating with the WTRUs 702 over air interface 714. Optionally, eNode-Bs 802 may implement MIMO technology. Thus, one of eNode-Bs 802, for example, may use multiple antennas to transmit wireless signals to, or receive wireless signals from, one of WTRUs 702.

Each of eNode-Bs 802 may be associated with a particular cell (not shown) and may be configured to handle radio resource management decisions, handover decisions, scheduling of users in the uplink or downlink, or the like. As shown in FIG. 8 eNode-Bs 802 may communicate with one another over an X2 interface.

Core network 706 shown in FIG. 8 may include a mobility management gateway or entity (MME) 804, a serving gateway 806, or a packet data network (PDN) gateway 808. While each of the foregoing elements are depicted as part of core network 706, it will be appreciated that any one of these elements may be owned or operated by an entity other than the core network operator.

MME 804 may be connected to each of eNode-Bs 802 in RAN 704 via an S1 interface and may serve as a control node. For example, MME 804 may be responsible for authenticating users of WTRUs 702, bearer activation or deactivation, selecting a particular serving gateway during an initial attach of WTRUs 702, or the like. MME 804 may also provide a control plane function for switching between RAN 704 and other RANs (not shown) that employ other radio technologies, such as GSM or WCDMA.

Serving gateway 806 may be connected to each of eNode-Bs 802 in RAN 704 via the S1 interface. Serving gateway 806 may generally route or forward user data packets to or from the WTRUs 702. Serving gateway 806 may also perform other functions, such as anchoring user planes during inter-eNode B handovers, triggering paging when downlink data is available for WTRUs 702, managing or storing contexts of WTRUs 702, or the like.

Serving gateway 806 may also be connected to PDN gateway 808, which may provide WTRUs 702 with access to packet-switched networks, such as Internet 710, to facilitate communications between WTRUs 702 and IP-enabled devices.

Core network 706 may facilitate communications with other networks. For example, core network 706 may provide WTRUs 702 with access to circuit-switched networks, such as PSTN 708, such as through IMS core 714, to facilitate communications between WTRUs 702 and traditional landline communications devices. In addition, core network 706 may provide the WTRUs 702 with access to other networks 712, which may include other wired or wireless networks that are owned or operated by other service providers.

Figure 9:
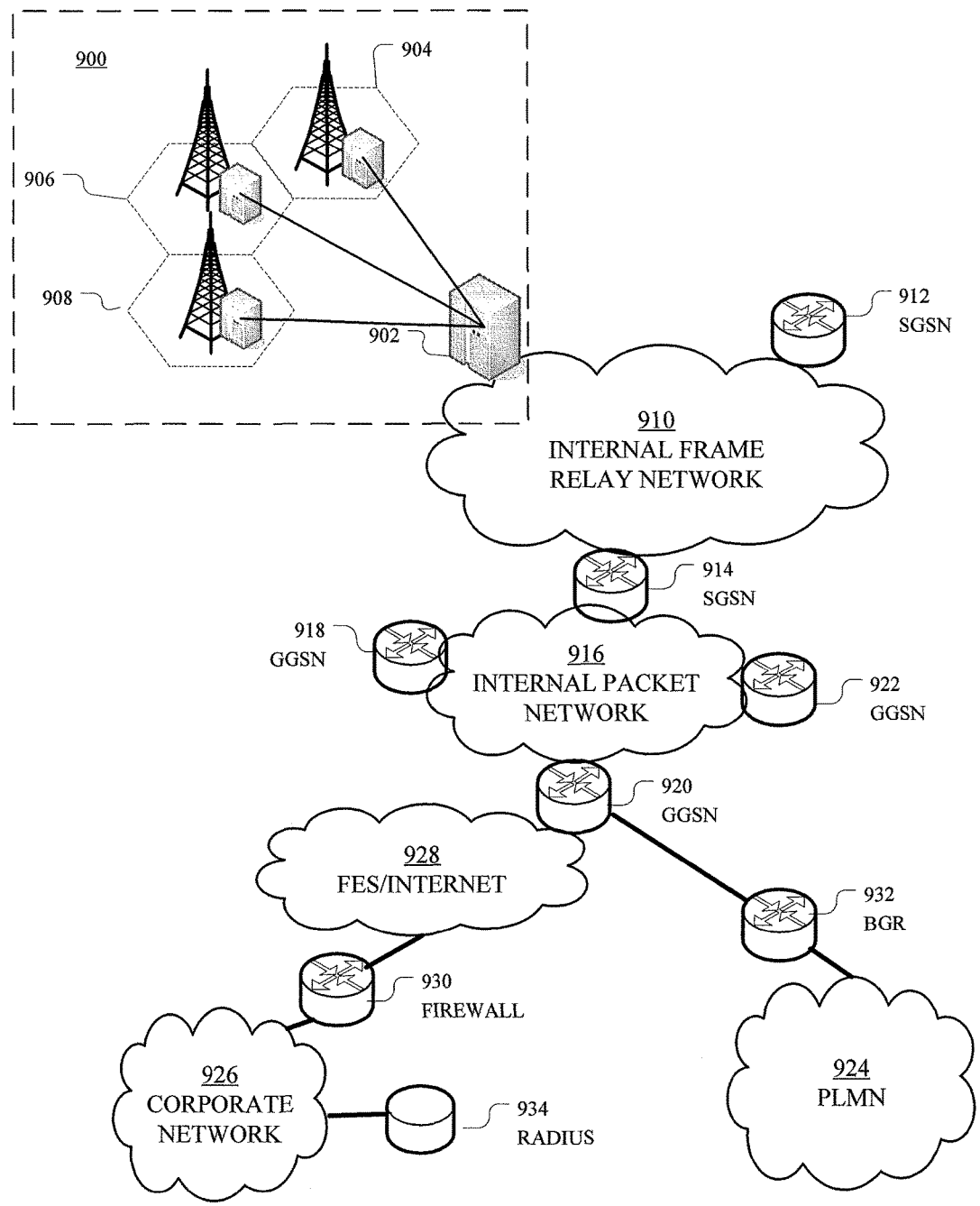
FIG. 9 depicts an overall block diagram of an example packet-based mobile cellular network environment, such as a general packet radio service (GPRS) network.

FIG. 9 depicts an overall block diagram of an example packet-based mobile cellular network environment, such as a GPRS network as described herein. In the example packet-based mobile cellular network environment shown in FIG. 9, there are a plurality of base station subsystems (BSS) 900 (only one is shown), each of which comprises a base station controller (BSC) 902 serving a plurality of BTSs, such as BTSs 904, 906, 908. BTSs 904, 906, 908 are the access points where users of packet-based mobile devices become connected to the wireless network. In example fashion, the packet traffic originating from mobile devices is transported via an over-the-air interface to BTS 908, and from BTS 908 to BSC 902. Base station subsystems, such as BSS 900, are a part of internal frame relay network 910 that can include a service GPRS support nodes (SGSN), such as SGSN 912 or SGSN 914. Each SGSN 912, 914 is connected to an internal packet network 916 through which SGSN 912, 914 can route data packets to or from a plurality of gateway GPRS support nodes (GGSN) 918, 920, 922. As illustrated, SGSN 914 and GGSNs 918, 920, 922 are part of internal packet network 916. GGSNs 918, 920, 922 mainly provide an interface to external IP networks such as PLMN 924, corporate intranets/internets 926, or Fixed-End System (FES) or the public Internet 928. As illustrated, subscriber corporate network 926 may be connected to GGSN 920 via a firewall 930. PLMN 924 may be connected to GGSN 920 via a boarder gateway router (BGR) 932. A Remote Authentication Dial-In User Service (RADIUS) server 934 may be used for caller authentication when a user calls corporate network 926.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 10:
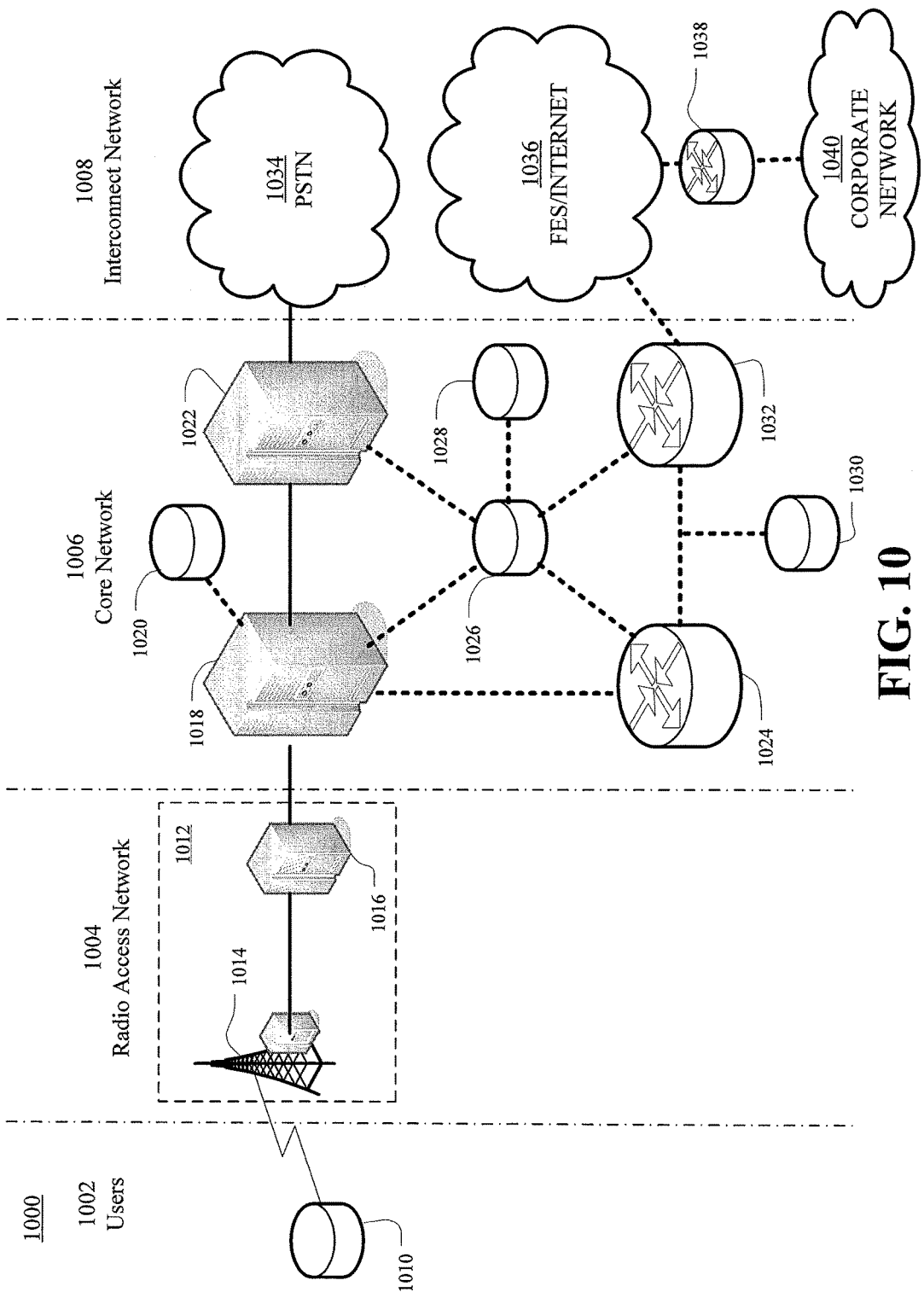
FIG. 10 illustrates an exemplary architecture of a GPRS network.

FIG. 10 illustrates an architecture of a typical GPRS network 1000 as described herein. The architecture depicted in FIG. 10 may be segmented into four groups: users 1002, RAN 1004, core network 1006, and interconnect network 1008. Users 1002 comprise a plurality of end users, who each may use one or more devices 1010. Note that device 1010 is referred to as a mobile subscriber (MS) in the description of network shown in FIG. 10. In an example, device 1010 comprises a communications device (e.g., mobile device 102, mobile positioning center 1016, network device, any detected devices, access devices, or the like, or any combination thereof). Radio access network 1004 comprises a plurality of BSSs such as BSS 1012, which includes a BTS 1014 and a BSC 1016. Core network 1006 may include a host of various network elements. As illustrated in FIG. 10, core network 1006 may comprise MSC 1018, service control point (SCP) 1020, gateway MSC (GMSC) 1022, SGSN 1024, home location register (HLR) 1026, authentication center (AuC) 1028, domain name system (DNS) server 1030, and GGSN 1032. Interconnect network 1008 may also comprise a host of various networks or other network elements. As illustrated in FIG. 10, interconnect network 1008 comprises a PSTN 1034, an FES/Internet 1036, a firewall 1038, or a corporate network 1040.

An MSC can be connected to a large number of BSCs. At MSC 1018, for instance, depending on the type of traffic, the traffic may be separated in that voice may be sent to PSTN 1034 through GMSC 1022, or data may be sent to SGSN 1024, which then sends the data traffic to GGSN 1032 for further forwarding.

When MSC 1018 receives call traffic, for example, from BSC 1016, it sends a query to a database hosted by SCP 1020, which processes the request and issues a response to MSC 1018 so that it may continue call processing as appropriate.

HLR 1026 is a centralized database for users to register to the GPRS network. HLR 1026 stores static information about the subscribers such as the International Mobile Subscriber Identity (IMSI), subscribed services, or a key for authenticating the subscriber. HLR 1026 also stores dynamic subscriber information such as the current location of the MS. Associated with HLR 1026 is AuC 1028, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when MS 1010 initiates the attach process by turning on the network capabilities of the mobile device, an attach request is sent by MS 1010 to SGSN 1024. The SGSN 1024 queries another SGSN, to which MS 1010 was attached before, for the identity of MS 1010. Upon receiving the identity of MS 1010 from the other SGSN, SGSN 1024 requests more information from MS 1010. This information is used to authenticate MS 1010 together with the information provided by HLR 1026. Once verified, SGSN 1024 sends a location update to HLR 1026 indicating the change of location to a new SGSN, in this case SGSN 1024. HLR 1026 notifies the old SGSN, to which MS 1010 was attached before, to cancel the location process for MS 1010. HLR 1026 then notifies SGSN 1024 that the location update has been performed. At this time, SGSN 1024 sends an Attach Accept message to MS 1010, which in turn sends an Attach Complete message to SGSN 1024.

Next, MS 1010 establishes a user session with the destination network, corporate network 1040, by going through a Packet Data Protocol (PDP) activation process. Briefly, in the process, MS 1010 requests access to the Access Point Name (APN), for example, UPS.com, and SGSN 1024 receives the activation request from MS 1010. SGSN 1024 then initiates a DNS query to learn which GGSN 1032 has access to the UPS.com APN. The DNS query is sent to a DNS server within core network 1006, such as DNS server 1030, which is provisioned to map to one or more GGSNs in core network 1006. Based on the APN, the mapped GGSN 1032 can access requested corporate network 1040. SGSN 1024 then sends to GGSN 1032 a Create PDP Context Request message that contains necessary information. GGSN 1032 sends a Create PDP Context Response message to SGSN 1024, which then sends an Activate PDP Context Accept message to MS 1010.

Once activated, data packets of the call made by MS 1010 can then go through RAN 1004, core network 1006, and interconnect network 1008, in a particular FES/Internet 1036 and firewall 1038, to reach corporate network 1040.

Figure 11:
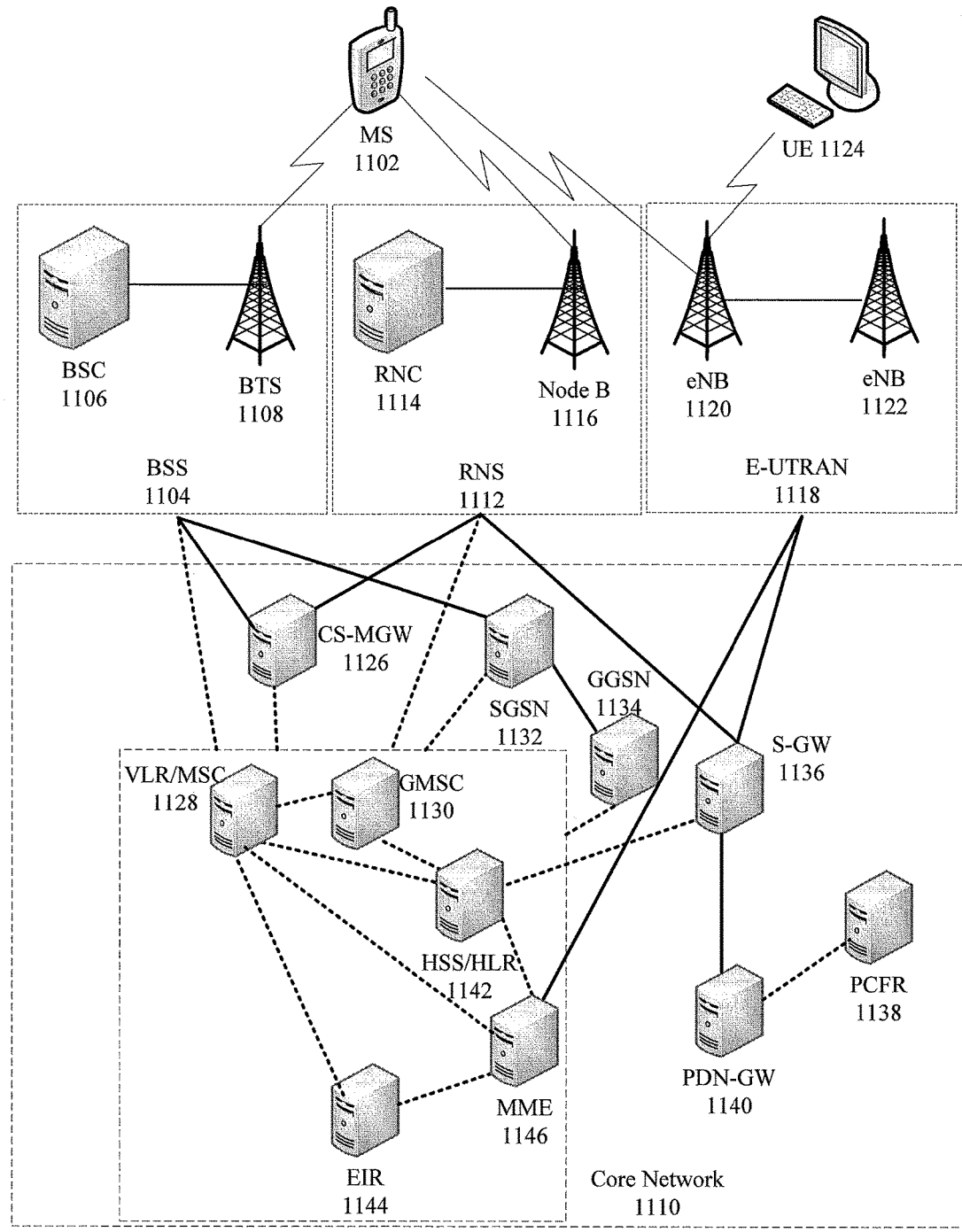
FIG. 11 is a block diagram of an exemplary public land mobile network (PLMN).

FIG. 11 illustrates a PLMN block diagram view of an example architecture that may be replaced by a telecommunications system. In FIG. 11, solid lines may represent user traffic signals, and dashed lines may represent support signaling MS 1102 is the physical equipment used by the PLMN subscriber. For example, network device 400, the like, or any combination thereof may serve as MS 1102. MS 1102 may be one of, but not limited to, a cellular telephone, a cellular telephone in combination with another electronic device or any other wireless mobile communication device.

MS 1102 may communicate wirelessly with BSS 1104. BSS 1104 contains BSC 1106 and a BTS 1108. BSS 1104 may include a single BSC 1106/BTS 1108 pair (base station) or a system of BSC/BTS pairs that are part of a larger network. BSS 1104 is responsible for communicating with MS 1102 and may support one or more cells. BSS 1104 is responsible for handling cellular traffic and signaling between MS 1102 and a core network 1110. Typically, BSS 1104 performs functions that include, but are not limited to, digital conversion of speech channels, allocation of channels to mobile devices, paging, or transmission/reception of cellular signals.

Additionally, MS 1102 may communicate wirelessly with RNS 1112. RNS 1112 contains a Radio Network Controller (RNC) 1114 and one or more Nodes B 1116. RNS 1112 may support one or more cells. RNS 1112 may also include one or more RNC 1114/Node B 1116 pairs or alternatively a single RNC 1114 may manage multiple Nodes B 1116. RNS 1112 is responsible for communicating with MS 1102 in its geographically defined area. RNC 1114 is responsible for controlling Nodes B 1116 that are connected to it and is a control element in a UMTS radio access network. RNC 1114 performs functions such as, but not limited to, load control, packet scheduling, handover control, security functions, or controlling MS 1102 access to core network 1110.

An E-UTRA Network (E-UTRAN) 1118 is a RAN that provides wireless data communications for MS 1102 and UE 1124. E-UTRAN 1118 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1118 may include of series of logical network components such as E-UTRAN Node B (eNB) 1120 and E-UTRAN Node B (eNB) 1122. E-UTRAN 1118 may contain one or more eNBs. User equipment (UE) 1124 may be any mobile device capable of connecting to E-UTRAN 1118 including, but not limited to, a personal computer, laptop, mobile device, wireless router, or other device capable of wireless connectivity to E-UTRAN 1118. The improved performance of the E-UTRAN 1118 relative to a typical UMTS network allows for increased bandwidth, spectral efficiency, and functionality including, but not limited to, voice, high-speed applications, large data transfer or IPTV, while still allowing for full mobility.

Typically MS 1102 may communicate with any or all of BSS 1104, RNS 1112, or E-UTRAN 1118. In a illustrative system, each of BSS 1104, RNS 1112, and E-UTRAN 1118 may provide MS 1102 with access to core network 1110. Core network 1110 may include of a series of devices that route data and communications between end users. Core network 1110 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1126 is part of core network 1110, and interacts with VLR/MSC server 1128 and GMSC server 1130 in order to facilitate core network 1110 resource control in the CS domain. Functions of CS-MGW 1126 include, but are not limited to, media conversion, bearer control, payload processing or other mobile network processing such as handover or anchoring. CS-MGW 1126 may receive connections to MS 1102 through BSS 1104 or RNS 1112.

SGSN 1132 stores subscriber data regarding MS 1102 in order to facilitate network functionality. SGSN 1132 may store subscription information such as, but not limited to, the IMSI, temporary identities, or PDP addresses. SGSN 1132 may also store location information such as, but not limited to, GGSN address for each GGSN 1134 where an active PDP exists. GGSN 1134 may implement a location register function to store subscriber data it receives from SGSN 1132 such as subscription or location information.

Serving gateway (S-GW) 1136 is an interface which provides connectivity between E-UTRAN 1118 and core network 1110. Functions of S-GW 1136 include, but are not limited to, packet routing, packet forwarding, transport level packet processing, or user plane mobility anchoring for inter-network mobility. PCRF 1138 uses information gathered from P-GW 1136, as well as other sources, to make applicable policy and charging decisions related to data flows, network resources or other network administration functions. PDN gateway (PDN-GW) 1140 may provide user-to-services connectivity functionality including, but not limited to, GPRS/EPC network anchoring, bearer session anchoring and control, or IP address allocation for PS domain connections.

HSS 1142 is a database for user information and stores subscription data regarding MS 1102 or UE 1124 for handling calls or data sessions. Networks may contain one HSS 1142 or more if additional resources are required. Example data stored by HSS 1142 include, but is not limited to, user identification, numbering or addressing information, security information, or location information. HSS 1142 may also provide call or session establishment procedures in both the PS and CS domains.

VLR/MSC Server 1128 provides user location functionality. When MS 1102 enters a new network location, it begins a registration procedure. A MSC server for that location transfers the location information to the VLR for the area. A VLR and MSC server may be located in the same computing environment, as is shown by VLR/MSC server 1128, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1102 registration or procedures for handover of MS 1102 to a different section of core network 1110. GMSC server 1130 may serve as a connection to alternate GMSC servers for other MSs in larger networks.

EIR 1144 is a logical element which may store the IMEI for MS 1102. User equipment may be classified as either "white listed" or "black listed" depending on its status in the network. If MS 1102 is stolen and put to use by an unauthorized user, it may be registered as "black listed" in EIR 1144, preventing its use on the network. A MME 1146 is a control node which may track MS 1102 or UE 1124 if the devices are idle. Additional functionality may include the ability of MME 1146 to contact idle MS 1102 or UE 1124 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

Figure 12:
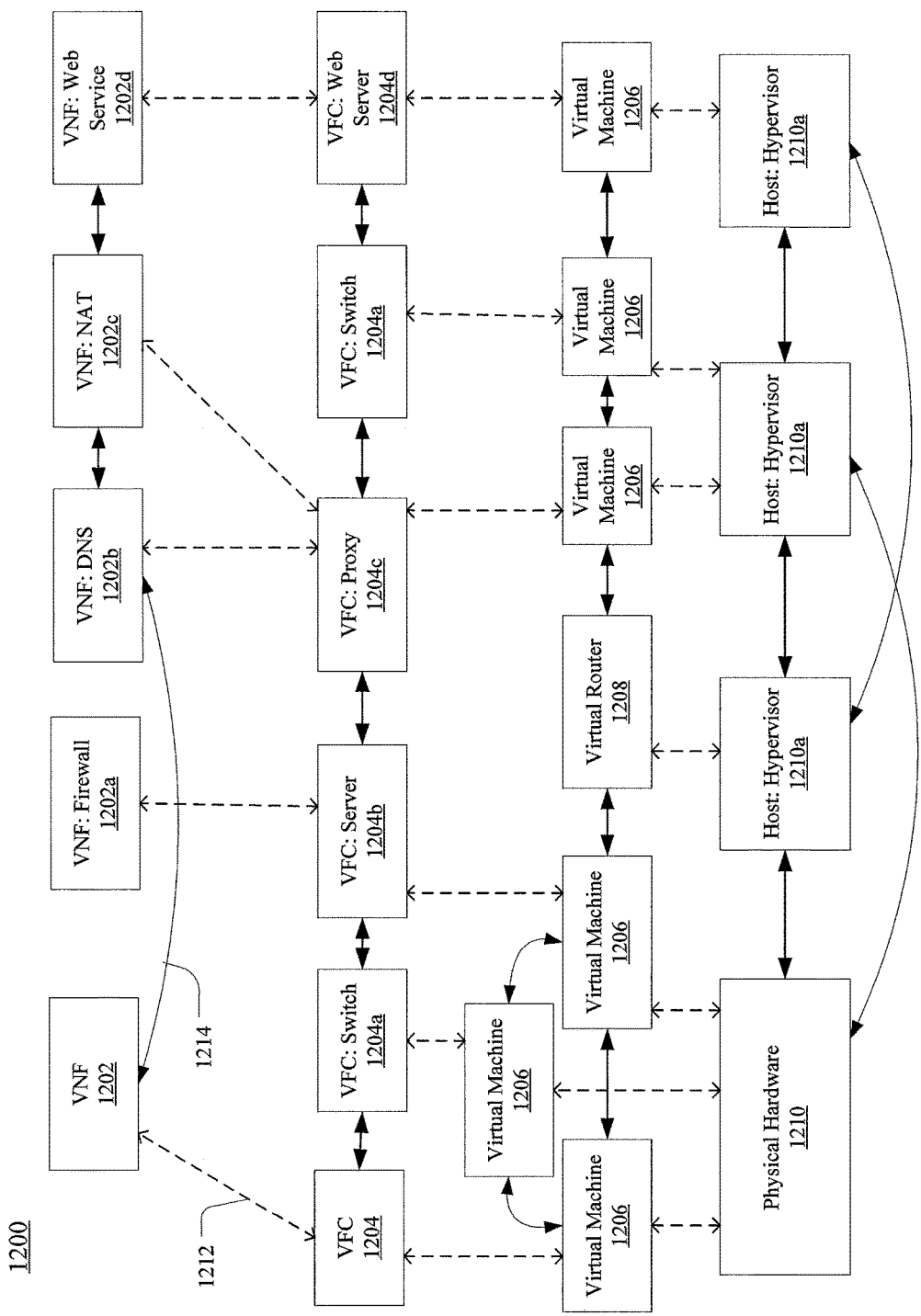
FIG. 12 illustrates a representation of an example network including virtual network functions.

FIG. 12 is a representation of an exemplary network 1200. Network 1200 may comprise an SDN—that is, network 1200 may include one or more virtualized functions implemented on general purpose hardware, such as in lieu of having dedicated hardware for every network function. That is, general purpose hardware of network 1200 may be configured to run virtual network elements to support communication services, such as mobility services, including consumer services and enterprise services. These services may be provided or measured in sessions.

A virtual network functions (VNFs) 1202 may be able to support a limited number of sessions. Each VNF 1202 may have a VNF type that indicates its functionality or role. For example, FIG. 12 illustrates a gateway VNF 1202*a* and a policy and charging rules function (PCRF) VNF 1202*b*. Additionally or alternatively, VNFs 1202 may include other types of VNFs. Each VNF 1202 may use one or more virtual machines (VMs) 1204 to operate. Each VM 1204 may have a VM type that indicates its functionality or role. For example, FIG. 12 illustrates a MCM VM 1204*a*, an ASM VM 1204*b*, and a DEP VM 1204*c*. Additionally or alternatively, VMs 1204 may include other types of VMs. Each VM 1204 may consume various network resources from a hardware platform 1206, such as a resource 1208, a virtual central processing unit (vCPU) 1208*a*, memory 1208*b*, or a network interface card (NIC) 1208*c*. Additionally or alternatively, hardware platform 1206 may include other types of resources 1208.

While FIG. 12 illustrates resources 1208 as collectively contained in hardware platform 1206, the configuration of hardware platform 1206 may isolate, for example, certain memory 1208*c* from other memory 1208*c*.

Hardware platform 1206 may comprise one or more chasses 1210. Chassis 1210 may refer to the physical housing or platform for multiple servers or other network equipment. In an aspect, chassis 1210 may also refer to the underlying network equipment. Chassis 1210 may include one or more servers 1212. Server 1212 may comprise general purpose computer hardware or a computer. In an aspect, chassis 1210 may comprise a metal rack, and servers 1212 of chassis 1210 may comprise blade servers that are physically mounted in or on chassis 1210.

Each server 1212 may include one or more network resources 1208, as illustrated. Servers 1212 may be communicatively coupled together (not shown) in any combination or arrangement. For example, all servers 1212 within a given chassis 1210 may be communicatively coupled. As another example, servers 1212 in different chasses 1210 may be communicatively coupled. Additionally or alternatively, chasses 1210 may be communicatively coupled together (not shown) in any combination or arrangement.

The characteristics of each chassis 1210 and each server 1212 may differ. Additionally or alternatively, the type or number of resources 1210 within each server 1212 may vary. In an aspect, chassis 1210 may be used to group servers 1212 with the same resource characteristics. In another aspect, servers 1212 within the same chassis 1210 may have different resource characteristics.

Given hardware platform 1206, the number of sessions that may be instantiated may vary depending upon how efficiently resources 1208 are assigned to different VMs 1204. For example, assignment of VMs 1204 to particular resources 1208 may be constrained by one or more rules. For example, a first rule may require that resources 1208 assigned to a particular VM 1204 be on the same server 1212 or set of servers 1212. For example, if VM 1204 uses eight vCPUs 1208*a*, 1 GB of memory 1208*b*, and two NICs 1208*c*, the rules may require that all of these resources 1208 be sourced from the same server 1212. Additionally or alternatively, VM 1204 may require splitting resources 1208 among multiple servers 1212, but such splitting may need to conform with certain restrictions. For example, resources 1208 for VM 1204 may be able to be split between two servers 1212. Default rules may apply. For example, a default rule may require that all resources 1208 for a given VM 1204 must come from the same server 1212.

An affinity rule may restrict assignment of resources 1208 for a particular VM 1204 (or a particular type of VM 1204). For example, an affinity rule may require that certain VMs 1204 be instantiated on (that is, consume resources from) the same server 1212 or chassis 1210. For example, if VNF 1202 uses six MCM VMs 1204*a*, an affinity rule may dictate that those six MCM VMs 1204*a* be instantiated on the same server 1212 (or chassis 1210). As another example, if VNF 1202 uses MCM VMs 1204*a*, ASM VMs 1204*b*, and a third type of VMs 1204, an affinity rule may dictate that at least the MCM VMs 1204*a* and the ASM VMs 1204*b* be instantiated on the same server 1212 (or chassis 1210). Affinity rules may restrict assignment of resources 1208 based on the identity or type of resource 1208, VNF 1202, VM 1204, chassis 1210, server 1212, or any combination thereof.

An anti-affinity rule may restrict assignment of resources 1208 for a particular VM 1204 (or a particular type of VM 1204). In contrast to an affinity rule—which may require that certain VMs 1204 be instantiated on the same server 1212 or chassis 1210—an anti-affinity rule requires that certain VMs 1204 be instantiated on different servers 1212 (or different chasses 1210). For example, an anti-affinity rule may require that MCM VM 1204*a* be instantiated on a particular server 1212 that does not contain any ASM VMs 1204*b*. As another example, an anti-affinity rule may require that MCM VMs 1204*a* for a first VNF 1202 be instantiated on a different server 1212 (or chassis 1210) than MCM VMs 1204*a* for a second VNF 1202. Anti-affinity rules may restrict assignment of resources 1208 based on the identity or type of resource 1208, VNF 1202, VM 1204, chassis 1210, server 1212, or any combination thereof.

Within these constraints, resources 1208 of hardware platform 1206 may be assigned to be used to instantiate VMs 1204, which in turn may be used to instantiate VNFs 1202, which in turn may be used to establish sessions. The different combinations for how such resources 1208 may be assigned may vary in complexity and efficiency. For example, different assignments may have different limits of the number of sessions that can be established given a particular hardware platform 1206.

For example, consider a session that may require gateway VNF 1202*a* and PCRF VNF 1202*b*. Gateway VNF 1202*a* may require five VMs 1204 instantiated on the same server 1212, and PCRF VNF 1202*b* may require two VMs 1204 instantiated on the same server 1212. (Assume, for this example, that no affinity or anti-affinity rules restrict whether VMs 1204 for PCRF VNF 1202*b* may or must be instantiated on the same or different server 1212 than VMs 1204 for gateway VNF 1202*a*.) In this example, each of two servers 1212 may have sufficient resources 1208 to support 10 VMs 1204. To implement sessions using these two servers 1212, first server 1212 may be instantiated with 10 VMs 1204 to support two instantiations of gateway VNF 1202*a*, and second server 1212 may be instantiated with 9 VMs: five VMs 1204 to support one instantiation of gateway VNF 1202*a* and four VMs 1204 to support two instantiations of PCRF VNF 1202*b*. This may leave the remaining resources 1208 that could have supported the tenth VM 1204 on second server 1212 unused (and unusable for an instantiation of either a gateway VNF 1202*a* or a PCRF VNF 1202*b*). Alternatively, first server 1212 may be instantiated with 10 VMs 1204 for two instantiations of gateway VNF 1202*a* and second server 1212 may be instantiated with 10 VMs 1204 for five instantiations of PCRF VNF 1202*b*, using all available resources 1208 to maximize the number of VMs 1204 instantiated.

Consider, further, how many sessions each gateway VNF 1202*a* and each PCRF VNF 1202*b* may support. This may factor into which assignment of resources 1208 is more efficient. For example, consider if each gateway VNF 1202*a* supports two million sessions, and if each PCRF VNF 1202*b* supports three million sessions. For the first configuration—three total gateway VNFs 1202*a* (which satisfy the gateway requirement for six million sessions) and two total PCRF VNFs 1202*b* (which satisfy the PCRF requirement for six million sessions)—would support a total of six million sessions. For the second configuration—two total gateway VNFs 1202*a* (which satisfy the gateway requirement for four million sessions) and five total PCRF VNFs 1202*b* (which satisfy the PCRF requirement for 15 million sessions)—would support a total of four million sessions. Thus, while the first configuration may seem less efficient looking only at the number of available resources 1208 used (as resources 1208 for the tenth possible VM 1204 are unused), the second configuration is actually more efficient from the perspective of being the configuration that can support more the greater number of sessions.

To solve the problem of determining a capacity (or, number of sessions) that can be supported by a given hardware platform 1205, a given requirement for VNFs 1202 to support a session, a capacity for the number of sessions each VNF 1202 (e.g., of a certain type) can support, a given requirement for VMs 1204 for each VNF 1202 (e.g., of a certain type), a give requirement for resources 1208 to support each VM 1204 (e.g., of a certain type), rules dictating the assignment of resources 1208 to one or more VMs 1204 (e.g., affinity and anti-affinity rules), the chasses 1210 and servers 1212 of hardware platform 1206, and the individual resources 1208 of each chassis 1210 or server 1212 (e.g., of a certain type), an integer programming problem may be formulated.

First, a plurality of index sets may be established. For example, index set L may include the set of chasses 1210. For example, if a system allows up to 6 chasses 1210, this set may be:

$L=\{1,2,3,4,5,6\}$, where 1 is an element of L.

Another index set J may include the set of servers 1212. For example, if a system allows up to 16 servers 1212 per chassis 1210, this set may be:

$J=\{1,2,3,\ldots,16\}$, where j is an element of J.

As another example, index set K having at least one element k may include the set of VNFs 1202 that may be considered. For example, this index set may include all types of VNFs 1202 that may be used to instantiate a service. For example, let $K=\{GW,PCRF\}$ where GW represents gateway VNFs 1202*a* and PCRF represents PCRF VNFs 1202*b*.

Another index set I(k) may equal the set of VMs 1204 for a VNF 1202 *k*.
Thus, let $I(GW)=\{MCM,ASM,IOM,WSM,CCM,DCM\}$ represent VMs 1204 for gateway VNF 1202*a*, where MCM represents MCM VM 1204*a*, ASM represents ASM VM 1204*b*, and each of IOM, WSM, CCM, and DCM represents a respective type of VM 1204. Further, let $I(PCRF)=\{DEP,DIR,POL,SES,MAN\}$ represent VMs 1204 for PCRF VNF 1202*b*, where DEP represents DEP VM 1204*c* and each of DIR, POL, SES, and MAN represent a respective type of VM 1204.

Another index set V may include the set of possible instances of a given VM 1204. For example, if a system allows up to 20 instances of VMs 1202, this set may be:

$V=\{1,2,3,\ldots,20\}$, where v is an element of V.

In addition to the sets, the integer programming problem may include additional data. The characteristics of VNFs 1202, VMs 1204, chasses 1210, or servers 1212 may be factored into the problem. This data may be referred to as parameters. For example, for given VNF 1202 *k*, the number of sessions that VNF 1202 *k* can support may be defined as a function S(k). In an aspect, for an element k of set K, this parameter may be represented by $S(k)>=0$;

is a measurement of the number of sessions k can support. Returning to the earlier example where gateway VNF 1202*a* may support two million sessions, then this parameter may be S(GW)=2,000,000.

VM 1204 modularity may be another parameter in the integer programming problem. VM 1204 modularity may represent the VM 1204 requirement for a type of VNF 1202. For example, fork that is an element of set K and i that is an element of set I, each instance of VNF k may require M(k, i) instances of VMs 1204. For example, recall the example where $I(GW)=\{MCM,ASM,IOM,WSM,CCM,DCM\}$.

In an example, M(GW, I(GW)) may be the set that indicates the number of each type of VM 1204 that may be required to instantiate gateway VNF 1202*a*. For example, $$M(GW, I(GW)) = \{2, 16, 4, 4, 2, 4\}$$

may indicate that one instantiation of gateway VNF 1202*a* may require two instantiations of MCM VMs 1204*a*, 16 instantiations of ACM VM 1204*b*, four instantiations of IOM VM 1204, four instantiations of WSM VM 1204, two instantiations of CCM VM 1204, and four instantiations of DCM VM 1204.

Another parameter may indicate the capacity of hardware platform 1206. For example, a parameter C may indicate the number of vCPUs 1208*a* required for each VM 1204 type i and for each VNF 1202 type k. For example, this may include the parameter C(k, i).

For example, if MCM VM 1204*a* for gateway VNF 1202*a* requires 20 vCPUs 1208*a*, this may be represented as $$C(GW, MCM) = 20.$$

However, given the complexity of the integer programming problem—the numerous variables and restrictions that must be satisfied—implementing an algorithm that may be used to solve the integer programming problem efficiently, without sacrificing optimality, may be difficult.

While examples of a telecommunications system in which communication can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, (or distributed among a plurality of machines) the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and systems associated with a aspects described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While examples of hybrid clouds, network environments, and other aspects relevant to the inventions herein, have been described in connection with various computing devices/processors, the underlying concepts may be applied to other environments, networks, computing devices, processors, or systems subject to similar requirements and constraints. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The systems, methods, and/or techniques associated with hybrid clouds described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While techniques herein are described in connection with the various examples of the various figures, it is to be understood that other similar implementations may be used, or modifications and additions may be made to the described example techniques, without deviating from the scope or spirit of the innovation. For example, one skilled in the art will recognize that hybrid cloud techniques herein may apply to environments other than those expressly identified, whether wired or wireless, and may be applied to any number of such environments via a communications network and interacting across the network. Therefore, hybrid clouds as described herein should not be limited to any single example, but rather should be construed in breadth and scope in accordance with the appended claims and the entirety of the disclosure.

In describing preferred methods, systems, or apparatuses of the subject matter of the present disclosure—hybrid clouds leveraging edge devices and systems or methods utilizing such—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
    identifying an edge device in network communication with a cloud extension component of a managed hybrid cloud, wherein the edge device is located outside a core network supporting the managed hybrid cloud;
    deploying a lightweight management container to the edge device, the lightweight management container sharing a common control plane with a standard management container used on a traditional compute node in the managed hybrid cloud;
    enrolling the edge device in the managed hybrid cloud using the lightweight management container; and
    satisfying a resource request directed to the managed hybrid cloud using a resource of the edge device.

2. The method of claim 1, further comprising:
    receiving the resource request, the resource request associated with a standard management container before deploying the lightweight management container; and
    determining requirements of the resource request, the lightweight management container provides functionality to respond to the resource request without duplicating all modules of the standard management container.

3. The method of claim 1, further comprising:
    controlling the edge device using a conductor component associated with the cloud extension component of the managed hybrid cloud; and
    controlling the traditional compute node using the conductor component, the conductor component compatible for both edge device control and traditional compute node control.

4. The method of claim 1,
    wherein the edge device is identified based on a constraint, and
    wherein the constraint is one of a geographic location, velocity, acceleration, sensor capability, processing capability, memory capability, or verification of affirmative participation in the managed hybrid cloud.

5. The method of claim 1, further comprising managing communication in the managed hybrid cloud to or from the edge device, communication being transmitted using a long range technique or an ad hoc technique.

6. The method of claim 1, further comprising running at least a portion of an application satisfying the resource request on the edge device using the lightweight management container.

7. The method of claim 6, the application is distributed among a plurality of edge devices having the lightweight management container.

8. The method of claim 1, the lightweight management container and the standard management container communicate within the managed hybrid cloud using a common messaging protocol.

9. The method of claim 1, further comprising monitoring the edge device for changes using a monitor component.

10. The method of claim 1, wherein the edge device is a mobile device.

11. A system, comprising:
    a non-transitory computer-readable medium storing instructions; and
    a processor operatively coupled to the non-transitory computer-readable medium and configured to execute the instructions, wherein the instructions when executed by the processor effectuate:
    a cloud extension component of a managed hybrid cloud, the cloud extension component configured to communicate with edge devices located outside datacenters and traditional compute nodes within datacenters,
    wherein the cloud extension component deploys a standard management container to traditional compute nodes,
    wherein the cloud extension component deploys a lightweight management container to the edge devices, the lightweight management container sharing a common control plane with the standard management container used on a traditional compute node in the managed hybrid cloud, the lightweight management container enrolls one or more of the edge devices in the managed hybrid cloud; and
    a conductor component of the cloud extension component, the conductor component controls the edge devices, and the conductor component controls the traditional compute nodes,
    wherein the conductor component controls the edge devices to satisfy a resource request directed to the managed hybrid cloud.

12. The system of claim 11, the edge devices communicate in the managed hybrid cloud using a long range technique or an ad hoc technique.

13. The system of claim 11, wherein at least a portion of a cloud application satisfying the resource request is run on the edge devices using the lightweight management container.

14. The system of claim 11, the lightweight management container and the standard management container communicate using a common messaging protocol.

15. The system of claim 11, wherein the non-transitory computer-readable medium stores instructions that when executed by the processor effectuate:
    a monitor component that monitors the edge devices for changes.

16. A system comprising a processor and computer readable media storing instructions configured to:
    identify an edge device in network communication with a cloud extension component of a managed hybrid cloud;
    deploy a lightweight management container to the edge device, the lightweight management container sharing a common control plane with a standard management container used on a traditional compute node in the managed hybrid cloud, wherein the traditional compute node is located in a datacenter and the edge device is located outside any datacenter;
    enroll the edge device in the managed hybrid cloud using the lightweight management container; and
    satisfy a resource request directed to the managed hybrid cloud using a resource of the edge device.

17. The system of claim 16, the instructions further configured to:
- receive the resource request satisfied by the edge device, the resource request associated with a standard management container before deploying the lightweight management container; and
- determine requirements of the resource request, the lightweight management container provides functionality to respond to the resource request without duplicating all modules of the standard management container.

18. The system of claim 16, the instructions further configured to monitor the edge device for changes using a monitor component.

19. The system of claim 18, the instructions further configured to identify the edge device based on a constraint, the constraint is monitored as one of the changes.

* * * * *